United States Patent
Wang et al.

(10) Patent No.: US 12,490,048 B2
(45) Date of Patent: Dec. 2, 2025

(54) COMMUNICATION METHOD AND APPARATUS TO IMPROVE RESOURCE UTILIZATION AND RELIABILITY OF TRANSMISSION OF SERVICE DATA

(71) Applicant: HUAWEI TECHNOLOGIES CO., LTD., Guangdong (CN)

(72) Inventors: Junwei Wang, Shenzhen (CN); Xingwei Zhang, Lund (SE)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 1033 days.

(21) Appl. No.: 17/541,641

(22) Filed: Dec. 3, 2021

(65) Prior Publication Data

US 2022/0095076 A1 Mar. 24, 2022

Related U.S. Application Data

(63) Continuation of application No. PCT/CN2020/094729, filed on Jun. 5, 2020.

(30) Foreign Application Priority Data

Jun. 6, 2019 (CN) .......................... 201910492591.1

(51) Int. Cl.
  *H04W 4/02* (2018.01)
  *H04L 1/1812* (2023.01)
  (Continued)

(52) U.S. Cl.
  CPC .......... *H04W 4/023* (2013.01); *H04L 1/1819* (2013.01); *H04L 5/0051* (2013.01); *H04W 4/46* (2018.02)

(58) Field of Classification Search
  CPC ....... H04W 4/023; H04W 4/46; H04W 4/021; H04W 4/029; H04W 4/40; H04W 76/14;
  (Continued)

(56) References Cited

U.S. PATENT DOCUMENTS

2017/0273128 A1* 9/2017 Abedini ................ H04W 76/14
2019/0132104 A1* 5/2019 Lee ........................ H04W 4/40
(Continued)

FOREIGN PATENT DOCUMENTS

CN 102547975 A 7/2012
CN 103167521 A 6/2013
(Continued)

OTHER PUBLICATIONS

R1-1907083, Sequans Communications, On HARQ procedure for NR sidelink, 3GPP TSG RAN WG1 Meeting #97, Reno, USA, May 13-17, 2019, total 5 pages.
(Continued)

*Primary Examiner* — Marcus Hammonds
(74) *Attorney, Agent, or Firm* — WOMBLE BOND DICKINSON (US) LLP

(57) ABSTRACT

Communications methods and apparatus for ensuring service data transmission reliability are described. The described methods and apparatus can relate to the field of communication technologies, and in particular, to vehicle to anything (V2X), intelligent driving, an intelligent connected vehicle, and similar communication technologies. For example, a method can include a first terminal receiving service data from a second terminal. If a distance value between the first terminal and the second terminal falls within a preset distance range, the first terminal sends, based on a preset condition, acknowledgment information indicating that the service data is received successfully or unsuccessfully to the second terminal. The preset distance range is determined based on a first preset distance value and a second preset distance value, and the second preset distance value is greater than the first preset distance value. The method can be applied to a communication process between terminals.

15 Claims, 25 Drawing Sheets

(51) Int. Cl.
H04L 5/00 (2006.01)
H04W 4/46 (2018.01)

(58) Field of Classification Search
CPC ... H04L 1/1819; H04L 5/0051; H04L 1/1845; H04L 1/1848; H04L 2001/0092; H04L 1/1854; H04L 1/203; H04L 1/1812; H04L 1/1607
See application file for complete search history.

(56) References Cited

U.S. PATENT DOCUMENTS

2021/0274327 A1* 9/2021 Zhao ............... H04L 1/1812
2022/0183092 A1* 6/2022 Lee ..................... H04L 5/00

FOREIGN PATENT DOCUMENTS

| CN | 106372213 A | 2/2017 |
|---|---|---|
| CN | 108632782 A | 10/2018 |
| CN | 109075908 A | 12/2018 |
| CN | 109417685 A | 3/2019 |
| EP | 1871032 A1 | 12/2007 |
| EP | 3432657 A1 | 1/2019 |
| EP | 3641179 A1 | 4/2020 |
| WO | 2018227574 A1 | 12/2018 |
| WO | 2019004688 A1 | 1/2019 |

OTHER PUBLICATIONS

3GPP TR 22.886 V16.2.0 (Dec. 2018), 3rd Generation Partnership Project; Technical Specification Group Services and System Aspects;Study on enhancement of 3GPP Support for 5G V2X Services(Release 16), total 76 pages.

R1-1907096, InterDigital, Inc., On Physical Layer Procedures for NR V2X Sidelink, 3GPP TSG RAN WG1 #97, Reno, USA, May 13-17, 2019, total 10 pages.

3GPP TS 23.501 V16.0.2 (Apr. 2019), 3rd Generation Partnership Project; Technical Specification Group Services and System Aspects;System Architecture for the 5G System;Stage 2(Release 16), total 317 pages.

3GPP TR 23.786 V16.0.0 (Mar. 2019), 3rd Generation Partnership Project; Technical Specification Group Services and System Aspects; Study on architecture enhancements for theEvolved Packet System (EPS) and the 5G System (5GS) to support advanced V2X services(Release 16), total 118 pages.

R1-1901537, Huawei et al., Sidelink physical layer procedures for NR V2X, 3GPP TSG RAN WG1 Meeting #96, Athens, Greece, Feb. 25-Mar. 1, 2019, total 16 pages.

R1-1902995, Qualcomm Incorporated, Physical layer procedures for HARQ operation for groupcast and unicast transmissions, 3GPP TSG RAN WG1 Meeting #96, Athens, Greece, Feb. 25-Mar. 1, 2019, total 12 pages.

R1-1903164, Ericsson, Remaining details on PHY procedures for Rel. 16 NR V2X , 3GPP TSG-RAN WG1 Meeting #96, Athens, Greece Feb. 25-Mar. 1, 2019, total 13 pages.

* cited by examiner

COMMUNICATION METHOD AND APPARATUS TO IMPROVE RESOURCE UTILIZATION AND RELIABILITY OF TRANSMISSION OF SERVICE DATA

CROSS-REFERENCE TO RELATED APPLICATIONS

This application is a continuation of International Application No. PCT/CN2020/094729, filed on Jun. 5, 2020, which claims priority to Chinese Patent Application No. 201910492591.1, filed on Jun. 6, 2019. The disclosures of the aforementioned applications are hereby incorporated by reference in their entireties.

TECHNICAL FIELD

This application relates to the field of communication technologies, especially vehicle to everything (V2X), intelligent driving, an intelligent connected vehicle, and the like, and in particular, to a communication method and apparatus.

BACKGROUND

In a wireless communication system, a hybrid automatic repeat request (HARQ) technology is generally used between two terminals to improve data transmission reliability. After receiving a transport block (TB) from a second terminal, a first terminal feeds back HARQ information to the second terminal, to notify the second terminal of a receiving status of the transport block. The HARQ information includes acknowledgment (ACK) and negative acknowledgment (NACK). Specifically, if the first terminal successfully receives the transport block from the second terminal, the first terminal feeds back ACK to the second terminal. If the first terminal unsuccessfully receives the transport block, the first terminal feeds back NACK to the second terminal, so that the second terminal retransmits the transport block after receiving the NACK.

Currently, the HARQ technology is introduced in vehicle to everything (V2X) multicast, to ensure a requirement of quality of service (QoS).

For some security services, requirements of QoS are meaningful only within a specific distance range. For example, for intelligent driving, high quality of service is required only when a distance between vehicles falls within a service distance range. Refer to FIG. 1. An area in which a distance between a vehicle and a second terminal is less than or equal to a service distance d is referred to as an assurance area. A vehicle 1 serves as the second terminal. The vehicle 1 sends a transport block to another vehicle in a multicast manner. A vehicle 2, a vehicle 3, a vehicle 4, a vehicle 5, a vehicle 6, and a vehicle 7 all serve as first terminals. For the vehicle 2, the vehicle 3, the vehicle 4, and the vehicle 5, when the received transport block is incorrectly decoded, NACK information needs to be fed back, so that the vehicle 1 retransmits the transport block, to ensure quality of service. For the vehicle 6 and the vehicle 7, when the received transport block is incorrectly decoded, HARQ information does not need to be fed back.

In the foregoing service transmission process, a specific implementation process of determining whether a distance value between two terminals is less than or equal to a service distance d may include the following approaches. First, the second terminal broadcasts location information of the second terminal, and the first terminal receives the location information from the second terminal, and calculates the distance value between the first terminal and the second terminal based on location information of the first terminal, to determine whether the distance value between the two terminals is less than or equal to the service distance d. Second, the second terminal broadcasts a threshold of reference signal received power. The first terminal receives a signal from the second terminal, calculates the signal from the second terminal, to obtain the reference signal received power, and then determines, based on the threshold of the reference signal received power, whether the distance value between the two terminals is less than or equal to the service distance d.

With the first approach, location information is frequently exchanged between vehicles. Consequently, a large quantity of time-frequency resources are consumed, there are fewer time-frequency resources used to transmit service data, and a system capacity decreases. In addition, when the first terminal determines a location of the second terminal based on the location information from the second terminal, the determined location of the second terminal is accurate. With the second approach, the reference signal received power obtained through calculation cannot indicate an actual distance value between two vehicles. For example, when an obstruction exists between the two vehicles, strength of the signal received by the first terminal is weak. Consequently, the reference signal received power obtained through calculation decreases, and the distance value between the two vehicles that is determined based on the decreased reference signal received power is greater than the actual distance value between the two vehicles.

SUMMARY

Embodiments of this application provide a communication method and apparatus, to ensure reliable transmission of service data and improve resource utilization.

To achieve the foregoing objectives, the following technical solutions are used in the embodiments of this application.

According to a first aspect, an embodiment of this application provides a communication method, and the method is applied to a first terminal or a chip of a first terminal. The method includes: The first terminal receives service data from a second terminal; and if a distance value between the first terminal and the second terminal falls within a preset distance range, the first terminal sends, based on a preset condition, acknowledgment information indicating that the service data is received successfully or unsuccessfully to the second terminal. The preset distance range is determined based on a first preset distance value and a second preset distance value, and the second preset distance value is greater than the first preset distance value.

According to the communication method in this embodiment of this application, the first terminal receives the service data from the second terminal; and if the distance value between the first terminal and the second terminal falls within the preset distance range, the first terminal sends, based on the preset condition, the acknowledgment information indicating that the service data is received successfully or unsuccessfully to the second terminal. The preset distance range is determined based on the first preset distance value and the second preset distance value, and the second preset distance value is greater than the first preset distance value. In the conventional technology, when the first terminal is not in an assurance area (in other words, the distance value between the first terminal and the second terminal is greater than the first preset distance value), the acknowledgment information indicating that the service data is received successfully or unsuccessfully is not sent to the second terminal. The distance value is calculated inaccurately, and consequently transmission quality of the service data is affected. According to the communication method in this embodiment of this application, even if the first terminal is not in the assurance area, for example, the first terminal falls within the preset distance range, when the preset condition is met, the first terminal may also send the acknowledgment information indicating that the service data is received successfully or unsuccessfully to the second terminal. This can ensure the transmission quality of the service data, and can avoid a case in which all first terminals within the preset distance range need to feed back acknowledgment information, to avoid unnecessary data transmission.

In a possible embodiment, the preset condition includes that a time length between a first time point and a second time point is less than a preset time parameter, where the first time point is a time point at which the distance value is recently determined to be less than or equal to the first preset distance value, and the second time point is a time point at which the distance value is recently determined to fall within the preset distance range. That the first terminal sends, based on a preset condition, acknowledgment information indicating that the service data is received successfully or unsuccessfully to the second terminal includes: If the time length between the first time point and the second time point meets the preset condition, the first terminal sends the acknowledgment information indicating that the service data is received successfully or unsuccessfully to the second terminal.

In this way, when the time length between the first time point and the second time point meets the preset condition, it indicates that a time length from the distance value that is between the first terminal and the second terminal and that is less than or equal to the first preset distance value to the distance value that is between the first terminal and the second terminal and that falls within the preset distance range is less than or equal to a preset time parameter T, that is, a time length in which the first terminal enters a transition area from the assurance area does not exceed the preset time parameter T. In this case, if the first terminal receives the service data from the second terminal, the first terminal also sends the acknowledgment information indicating that the service data is received successfully or unsuccessfully to the second terminal, to ensure data transmission efficiency. Even if the distance value of the first terminal is calculated inaccurately, the data transmission efficiency can also be ensured. Even if the first terminal is in an area near the first preset distance value, quality of data transmission between the first terminal and the second terminal can also be ensured, and unnecessary data retransmission can further be avoided.

In a possible embodiment, the preset time parameter is used to configure a timer, timing duration of the timer is T, and the first time point is a start time point of the timer. That if the time length between the first time point and the second time point meets the preset condition, the first terminal sends the acknowledgment information indicating that the service data is received successfully or unsuccessfully to the second terminal includes: If the timer is in a running state, the first terminal sends the acknowledgment information indicating that the service data is received successfully or unsuccessfully to the second terminal.

In a possible embodiment, the service data is service data repeatedly transmitted by the second terminal, and is transmitted in a form of a transport block; and the preset condition includes that when the first terminal receives the transport block for the first time, the distance value is less than or equal to the first preset distance value. That the first terminal sends, based on a preset condition, acknowledgment information indicating that the service data is received successfully or unsuccessfully to the second terminal includes: If the retransmitted transport block meets the preset condition, the first terminal sends acknowledgment information indicating that the retransmitted transport block is received successfully or unsuccessfully to the second terminal.

Herein, that the retransmitted transport block meets the preset condition indicates that the distance value between the first terminal and the second terminal is less than or equal to the first preset distance value; and when the first terminal unsuccessfully receives the transport block for the first time and receives the retransmitted transport block from the second terminal, the distance value between the first terminal and the second terminal falls within the preset distance range. In this case, the first terminal also sends the acknowledgment information indicating that the retransmitted transport block is received successfully or unsuccessfully to the second terminal, to ensure data transmission efficiency.

In a possible embodiment, the service data is transmitted in a form of a transport block, and the preset condition includes that a block error rate is greater than a block error rate threshold. That the first terminal sends, based on a preset condition, acknowledgment information indicating that the service data is received successfully or unsuccessfully to the second terminal includes: If a current block error rate meets the preset condition, the first terminal sends acknowledgment information indicating that the transport block is received successfully or unsuccessfully to the second terminal.

Herein, that the current block error rate meets the preset condition indicates that the current block error rate is greater than the block error rate threshold. In this case, when receiving the transport block from the second terminal, the first terminal also sends the acknowledgment information indicating that the transport block is received successfully or unsuccessfully to the second terminal, to meet a transmission quality requirement of the service data.

In a possible embodiment, the communication method in this embodiment of this application further includes: If the distance value is less than or equal to the second preset distance value, the first terminal updates the current block error rate based on a status of the transport block being received successfully or unsuccessfully.

In a possible embodiment, the method in this embodiment of this application further includes: The first terminal corrects an initial distance value between the first terminal and the second terminal based on a relative movement speed between the first terminal and the second terminal and a preset correction time period, to obtain the distance value between the first terminal and the second terminal. Alternatively, the first terminal corrects an initial distance value between the first terminal and the second terminal based on a relative movement speed between the first terminal and the second terminal and a preset correspondence, to obtain the distance value between the first terminal and the second terminal. The initial distance value is a distance value indicated by reference signal received power, and the preset correspondence is a correspondence between the relative movement speed and a reference signal received power adjustment amount.

In this way, the first terminal corrects the initial distance value between the first terminal and the second terminal based on the relative movement speed between the first terminal and the second terminal and the preset correction time period, to obtain the distance value between the first terminal and the second terminal. The second terminal does not need to frequently send location information to the first terminal, thereby saving time-frequency resources.

According to a second aspect, an embodiment of this application provides a communication method, and the method is applied to a first terminal or a chip of a first terminal. The method includes: The first terminal obtains first location information of a second terminal at a first time point. The first terminal obtains second location information of the second terminal at a second time point. The first terminal determines a location of the second terminal based on the first location information and the second location information. The first location information indicates the location of the second terminal or a first configuration area in which the second terminal is located. The second location information indicates a second configuration area in which the second terminal is located, and configuration parameters of the first configuration area are different from configuration parameters of the second configuration area. The first time point is not later than the second time point.

According to the communication method in this embodiment of this application, the first terminal obtains the first location information of the second terminal at the first time point. The first terminal obtains the second location information of the second terminal at the second time point. The first terminal determines the location of the second terminal based on the first location information and the second location information. The first location information indicates the location of the second terminal or the first configuration area in which the second terminal is located. The second location information indicates the second configuration area in which the second terminal is located, and the configuration parameters of the first configuration area are different from the configuration parameters of the second configuration area. The first time point is not later than the second time point. In the conventional technology, when the location of the second terminal is determined by using an area code, a problem that the location is inaccurate exists only based on the one area code. According to the communication method in this embodiment of this application, the first location information can indicate the location of the second terminal or the first configuration area in which the second terminal is located, and the second location information indicates the second configuration area in which the second terminal is located. When determining the location of the second terminal, the first terminal needs to determine the location of the second terminal based on the first location information and the second location information, that is, based on the location of the second terminal (indicated by the first location information) and the second configuration area; or determine the location of the second terminal based on the first configuration area and the second configuration area whose configuration parameters are different from each other. This avoids the problem that the location is inaccurate or a problem that the second terminal cannot be located only based on the one area code.

In a possible embodiment, the first location information is carried in a broadcast message, radio resource control (RRC) signaling, medium access control (MAC) signaling, or sidelink control information (SCI).

In this way, the first terminal may obtain the first location information in a plurality of manners, to determine the location of the second terminal based on the second location information, thereby ensuring accuracy of determining the location of the second terminal.

In a possible embodiment, the second location information is carried in SCI.

In this way, the first terminal obtains the second location information by receiving the SCI, and then determines the location of the second terminal based on the first location information. Compared with manners of receiving the broadcast message, the RRC signaling, and the MAC signaling, a manner in which the first terminal obtains the second location information by receiving the SCI has strong timeliness and helps improve accuracy of determining the location of the second terminal.

In a possible embodiment, when the first location information indicates the first configuration area in which the second terminal is located, the first configuration area is greater than the second configuration area.

According to a third aspect, an embodiment of this application provides a communication apparatus. The communication apparatus may be the first terminal in the first aspect. The communication apparatus includes a receiver, a processor, and a transmitter. The receiver is configured to receive service data from a second terminal. The processor is configured to determine that a distance value between the communication apparatus and the second terminal falls within a preset distance range and meets a preset condition. The transmitter is configured to: when the processor determines that the distance value between the communication apparatus and the second terminal falls within the preset distance range and meets the preset condition, send acknowledgment information indicating that the service data is received successfully or unsuccessfully to the second terminal. The preset distance range is determined based on a first preset distance value and a second preset distance value, and the second preset distance value is greater than the first preset distance value.

In a possible embodiment, the preset condition includes that a time length between a first time point and a second time point is less than a preset time parameter, where the first time point is a time point at which the distance value is recently determined to be less than or equal to the first preset distance value, and the second time point is a time point at which the distance value is recently determined to fall within the preset distance range.

That the processor is configured to determine that the preset condition is met includes: the processor is configured to determine that the time length between the first time point and the second time point meets the preset condition.

In a possible embodiment, the preset time parameter is used to configure a timer, timing duration of the timer is T, and the first time point is a start time point of the timer.

That the processor is configured to determine that the time length between the first time point and the second time point meets the preset condition includes: the processor is configured to determine that the timer is in a running state.

In a possible embodiment, the service data is service data repeatedly transmitted by the second terminal, and is transmitted in a form of a transport block; and the preset condition includes that when the communication apparatus receives the transport block for the first time, the distance value is less than or equal to the first preset distance value.

That the processor is configured to determine that the preset condition is met includes: the processor is configured to determine that the retransmitted transport block meets the preset condition.

In a possible embodiment, the service data is transmitted in a form of a transport block, and the preset condition includes that a block error rate is greater than a block error rate threshold.

That the processor is configured to determine that the preset condition is met includes: the processor is configured to determine that a current block error rate meets the preset condition.

In a possible embodiment, the processor is further configured to: if the distance value is less than or equal to the second preset distance value, update the current block error rate based on a status of the transport block being received successfully or unsuccessfully.

In a possible embodiment, the processor is further configured to correct an initial distance value between the communication apparatus and the second terminal based on a relative movement speed between the communication apparatus and the second terminal and a preset correction time period, to obtain the distance value between the communication apparatus and the second terminal. Alternatively, the processor is further configured to correct an initial distance value between the communication apparatus and the second terminal based on a relative movement speed between the communication apparatus and the second terminal and a preset correspondence, to obtain the distance value between the communication apparatus and the second terminal, where the initial distance value is a distance value indicated by reference signal received power, and the preset correspondence is a correspondence between the relative movement speed and a reference signal received power adjustment amount.

According to a fourth aspect, an embodiment of this application provides a communication apparatus. The communication apparatus may be the first terminal in the second aspect. The communication apparatus includes a receiver and a processor. The receiver is configured to obtain first location information of a second terminal at a first time point. The receiver is further configured to obtain second location information of the second terminal at a second time point. The processor is configured to determine a location of the second terminal based on the first location information and the second location information. The first location information indicates the location of the second terminal or a first configuration area in which the second terminal is located. The second location information indicates a second configuration area in which the second terminal is located, and configuration parameters of the first configuration area are different from configuration parameters of the second configuration area. The first time point is not later than the second time point.

In a possible embodiment, the first location information is carried in a broadcast message, radio resource control (RRC) signaling, medium access control (MAC) signaling, or sidelink control information (SCI).

In a possible embodiment, the second location information is carried in SCI.

In a possible embodiment, when the first location information indicates the first configuration area in which the second terminal is located, the first configuration area is greater than the second configuration area.

According to a fifth aspect, this application provides a communication apparatus, configured to implement a function of the first terminal in the first aspect, or a function of the first terminal in the second aspect.

According to a sixth aspect, an embodiment of this application provides a communication apparatus. The communication apparatus has a function of implementing the communication method in any one of the foregoing aspects. The function may be implemented by hardware, or may be implemented by hardware by executing corresponding software. The hardware or the software includes one or more modules corresponding to the function.

According to a seventh aspect, an embodiment of this application provides a communication apparatus, including a processor and a memory. The memory is configured to store computer-executable instructions. When the communication apparatus runs, the processor executes the computer-executable instructions stored in the memory, so that the communication apparatus performs the communication method in any one of the foregoing aspects.

According to an eighth aspect, an embodiment of this application provides a communication apparatus, including a processor. The processor is configured to: couple to a memory, and after reading instructions in the memory, perform the communication method in any one of the foregoing aspects according to the instructions.

According to a ninth aspect, an embodiment of this application provides a computer-readable storage medium. The computer-readable storage medium stores instructions, and when the instructions are run on a computer, the computer is enabled to perform the communication method in any one of the foregoing aspects.

According to a tenth aspect, an embodiment of this application provides a computer program product including instructions. When the computer program product runs on a computer, the computer is enabled to perform the communication method in any one of the foregoing aspects.

According to an eleventh aspect, an embodiment of this application provides a circuit system. The circuit system includes a processing circuit, and the processing circuit is configured to perform the communication method in any one of the foregoing aspects.

According to a twelfth aspect, an embodiment of this application provides a chip, including a processor. The processor is coupled to a memory. The memory stores program instructions, and when the program instructions stored in the memory are executed by the processor, the communication method in any one of the foregoing aspects is implemented.

According to a thirteenth aspect, an embodiment of this application provides a communication system. The communication system includes the first terminal and the second terminal in any one of the foregoing aspects.

For technical effects brought by any design manner of the second to the thirteenth aspects, refer to technical effects brought by different embodiments of the first aspect. Details are not described herein again.

DESCRIPTION OF EMBODIMENTS

In the specification and accompanying drawings of this application, the terms "first", "second", and the like are intended to distinguish between different objects or distinguish between different processing of a same object, but do not describe a particular order of the objects. In addition, the terms "include", "have", and any other variant thereof mentioned in descriptions of this application are intended to cover a non-exclusive inclusion. For example, a process, a method, a system, a product, or a device that includes a series of steps or units is not limited to the listed steps or units, but optionally further includes other unlisted steps or units, or optionally further includes other inherent steps or units of the process, the method, the product, or the device. It should be noted that in embodiments of this application, a word such as "example" or "for example" is used to represent an example, an example illustration, or description. Any embodiment or design scheme described as an "example" or "for example" in the embodiments of this application should not be explained as being more preferred or having more advantages than another embodiment or design scheme. Exactly, use of the word such as "example" or "for example" is intended to present a related concept in a specific manner.

To make the embodiments of this application clearer, HARQ feedback and retransmission in the embodiments of this application is first briefly described.

To ensure effective data transmission, two transmission and retransmission manners are introduced in a communication system: transmission and retransmission based on a transport block (TB) and transmission and retransmission based on a code block group (CBG).

Figure 1:
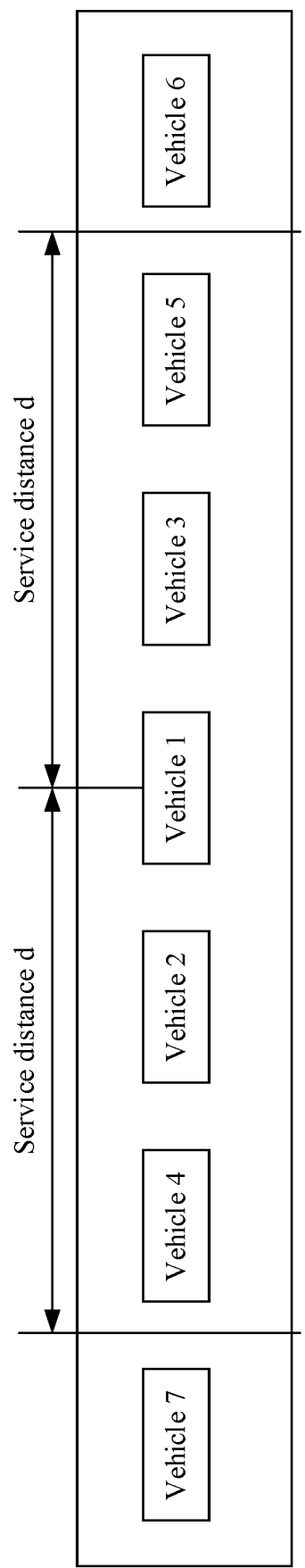
FIG. 1 is a schematic diagram of a distance-based quality-of-service requirement service scenario provided in a related technology.
Figure 2:
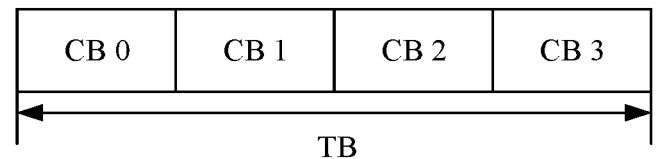
FIG. 2 is a schematic diagram of segmenting a transport block according to an embodiment of this application.
Figure 3:
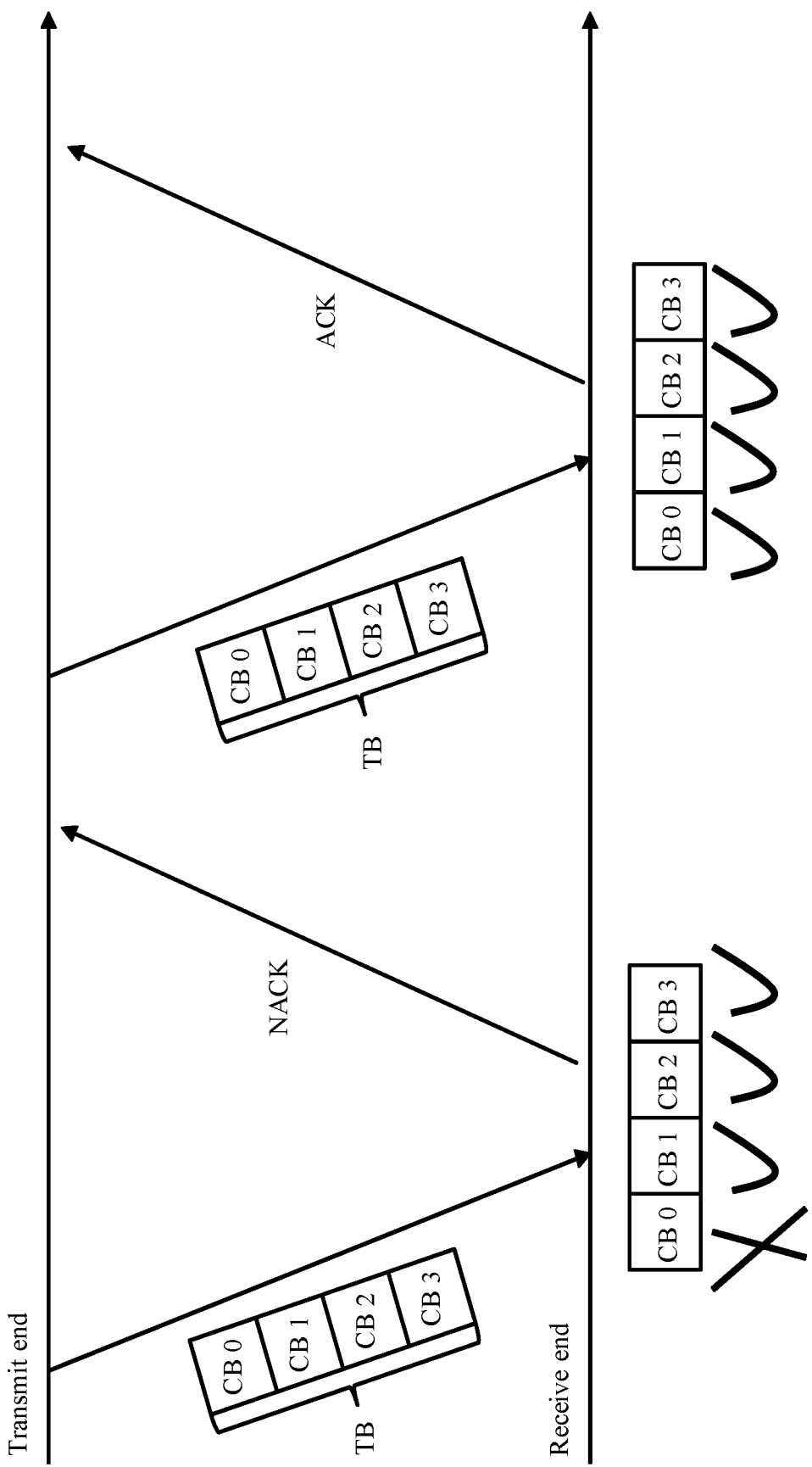
FIG. 3 is a flowchart of a transmission and retransmission method based on a transport block according to an embodiment of this application.

Referring to FIG. 2 and FIG. 3, an embodiment of a process of the transmission and retransmission based on a TB may include the following steps.

Step 1: A transmit end segments a to-be-sent TB into a plurality of code blocks (CB). Refer to FIG. 2. For example, one TB is segmented into four CBs, namely, a CB 0, a CB 1, a CB 2, and a CB 3. Cyclic redundancy check (CRC) is performed on each CB, and CRC is also performed on the entire TB. The transmit end sends a TB obtained through CRC to a receive end.

Step 2: The receive end receives, demodulates, decodes, and checks the TB obtained through CRC. Refer to FIG. 3. For example, check results of the four CBs are as follows: check of the CB 0 is error, and check of the CB 1, the CB 2, and the CB 3 is correct. In addition, in a possible case, when check of all the four CBs is correct, and check of the TB is correct, it indicates that the receive end successfully receives the TB (not shown in FIG. 3).

Step 3: The receive end sends negative acknowledgment (NACK) to the transmit end, to notify the transmit end that the TB is received unsuccessfully.

Step 4: The transmit end retransmits the TB obtained through check.

Step 5: The receive end receives the retransmitted TB, combines the retransmitted TB with the TB received in step 2, and when check of the CB 0, the CB 1, the CB 2, and the CB 3 is correct, and check of a TB is correct, sends acknowledgment (ACK) to the transmit end, to notify the transmit end that the TB is received successfully.

If CRC is error, for example, CRC of the CB 0 is error, the receive end repeatedly performs step 3, and the transmit end repeatedly performs step 4, until the receive end feeds back the ACK or a quantity of times that the transmit end retransmits the TB reaches a preset retransmission threshold.

Figure 4:
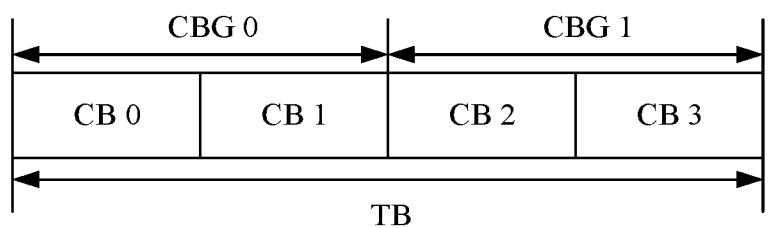
FIG. 4 is another schematic diagram of segmenting a transport block according to an embodiment of this application.
Figure 5:
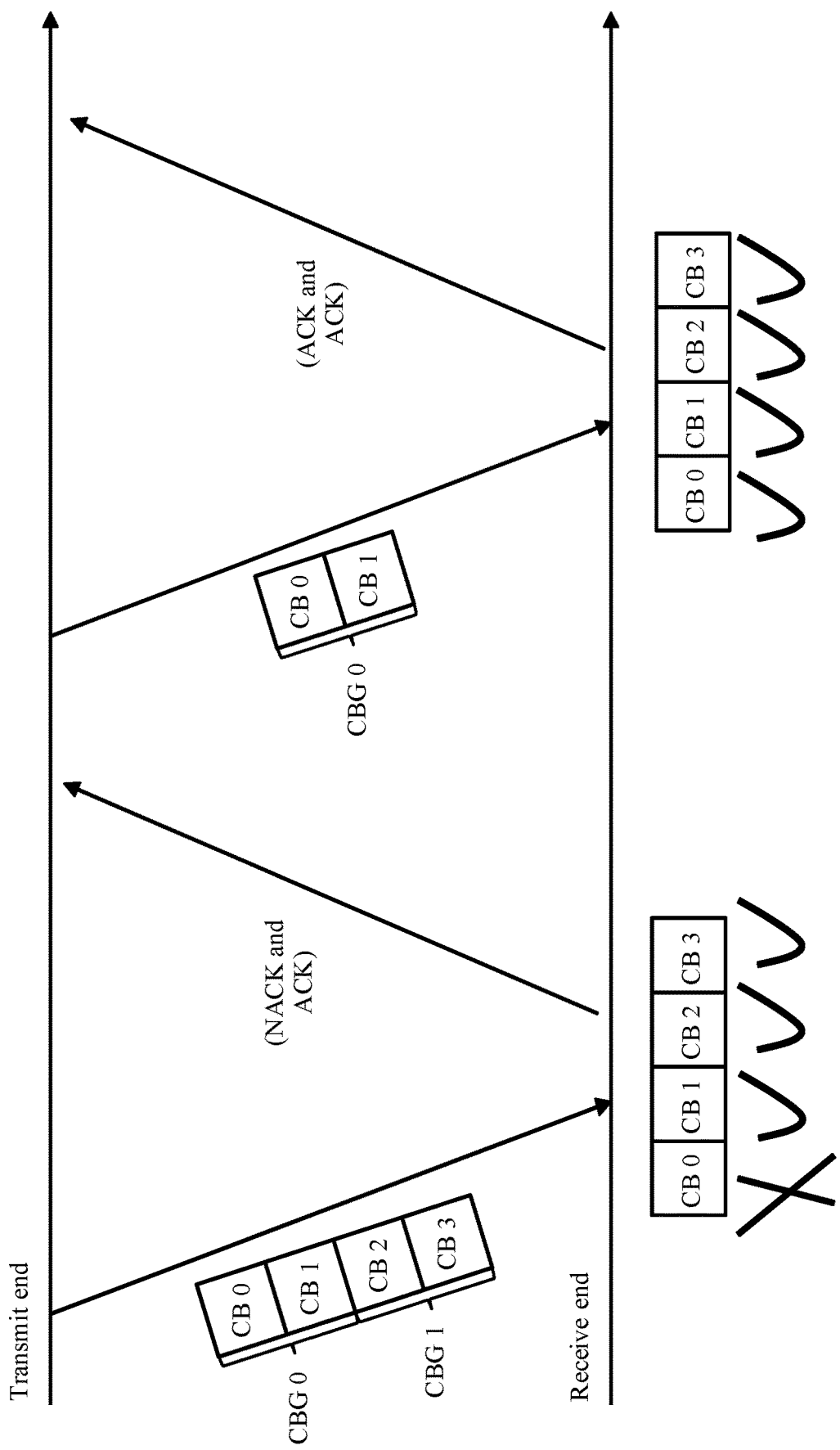
FIG. 5 is a flowchart of a transmission and retransmission method based on a code block group according to an embodiment of this application.

Referring to FIG. 4 and FIG. 5, an embodiment of a process of the transmission and retransmission based on a CBG may include the following steps.

Step 1: A transmit end segments a to-be-sent TB into N code blocks (CB), and the N CBs form M CBGs. N is determined based on a length of the TB, and M is a parameter configured by a network side. Refer to FIG. 4. For example, one TB is segmented into four CBs, namely, a CB 0, a CB 1, a CB 2, and a CB 3. The CB 0 and the CB 1 form a CBG 0, and the CB 2 and the CB 3 form a CBG 1. CRC is performed on each CB, and CRC is also performed on the entire TB. The transmit end sends a TB to a receive end.

Step 2: The receive end receives, demodulates, decodes, and checks the TB obtained through CRC. Refer to FIG. 5. For example, check results of the four CBs are as follows: check of the CB 0 in the CBG 0 is error, check of the CB 1 in the CBG 0 is correct, and check of the CB 2 and the CB 3 in the CBG 1 is correct. In addition, in a possible case, when check of all the four CBs is correct, and check of the TB is correct, it indicates that the receive end successfully receives the TB (not shown in FIG. 5).

Step 3: The receive end sends HARQ information to the transmit end, where HARQ information corresponding to the CBG 0 is NACK, and HARQ information corresponding to the CBG 1 is ACK.

Step 4: The transmit end retransmits the CBG 0.

Step 5: The receive end receives the retransmitted CBG 0, combines the retransmitted CBG 0 with the TB received in step 2, and when check of the CB 0, the CB 1, the CB 2, and the CB 3 is correct, and check of a TB is correct, sends HARQ information to the transmit end, where HARQ information corresponding to the CBG 0 and the CBG 1 is ACK.

If CRC is error, for example, CRC of the CB 0 is error, the receive end repeatedly performs step 3, and the transmit end repeatedly performs step 4, until the receive end feeds back M ACK or a quantity of retransmission times of the transmit end reaches a preset retransmission threshold. In some embodiments of this application, the receive end serves as a first terminal, and the transmit end serves as a second terminal. This is uniformly described herein, and details are not described again below.

Figure 6:
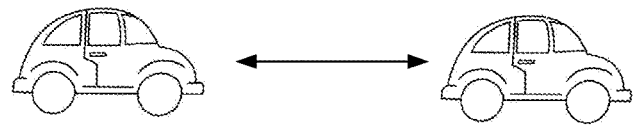
FIG. 6 and FIG. 7 are schematic diagrams of a communication system according to an embodiment of this application.
Figure 7:
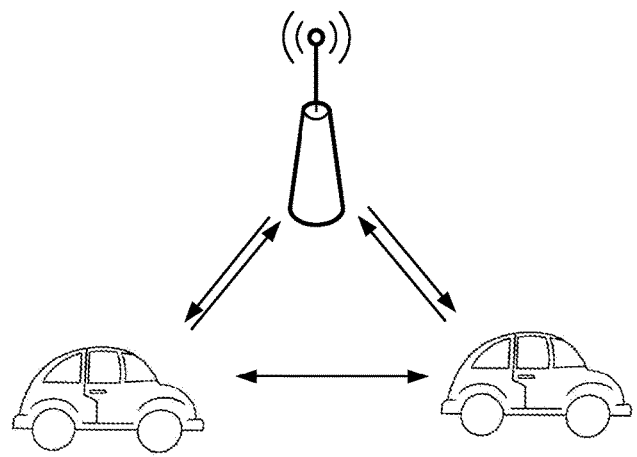

The embodiments of this application may be applied to a system for communication between terminals, for example, a V2X communication system or a device-to-device (D2D) system. Refer to FIG. 6. The communication system includes at least two terminals, and the two terminals can directly communicate with each other by using a sidelink (SL). Refer to FIG. 7. Optionally, the communication system further includes an access network device. The terminal may further communicate with the access network device (only two terminals are shown in FIG. 6 and FIG. 7). Information may be transmitted between the access network device and the terminal by using a radio wave, visible light, a laser, infrared, a photon, a power line, an optical fiber, a coaxial cable, a copper twisted pair, or the like.

The terminal is mainly configured to receive or send data. Optionally, the terminal in the embodiments of this application may be a device for implementing a function of the terminal or a component in a device. For example, the terminal includes but is not limited to various handheld devices, vehicle-mounted devices, wearable devices, or computing devices that have a wireless communication function, or other processing devices connected to a wireless modem; or may include a subscriber unit, a cellular phone, a smartphone, a wireless data card, a personal digital assistant (PDA) computer, a tablet computer, a handheld device, a laptop computer, a machine type communication (MTC) terminal, user equipment (UE), a mobile terminal, and the like. For another example, the terminal may be a component in any one of the foregoing devices (for example, the terminal may be a chip system in any one of the foregoing devices). The terminal in the embodiments of this application may alternatively be a vehicle-mounted module, a vehicle-mounted module, a vehicle-mounted component, a vehicle-mounted chip, or a vehicle-mounted unit that is built in a vehicle as one or more components or units. The vehicle may implement the method in this application by using the vehicle-mounted module, the vehicle-mounted module, the vehicle-mounted component, the vehicle-mounted chip, or the vehicle-mounted unit that is built in the vehicle. In some embodiments of this application, a terminal apparatus may also be referred to as a terminal. This is uniformly described herein, and details are not described again below.

The access network device is an apparatus that is deployed in a radio access network and that is configured to provide a wireless communication function. Optionally, the access network device may be a device that communicates with a wireless terminal by using one or more cells through an air interface of an access network. An apparatus for implementing a function of the access network device may be an access network device, or may be an apparatus (for example, a chip in the access network device) that supports the access network device to implement the function. Optionally, the access network device may perform attribute management on the air interface. A base station device may further coordinate attribute management on the air interface. The access network device includes a macro base station, a micro base station (which is also referred to as a small cell) such as a relay device in a relay station or a chip in a relay device, a transmission reception point (TRP), an evolved NodeB (eNB), a next generation NodeB (gNodeB or gNB), a next generation evolved NodeB (ng evolved NodeB or ng-eNB), and the like in various forms. Alternatively, in a distributed base station scenario, the access network device may be a baseband unit (BBU) and a remote radio unit (RRU). In a cloud radio access network (CRAN) scenario, the access network device may be a baseband pool (BBU pool) and an RRU.

The communication system shown in FIG. 6 and FIG. 7 may be applied to a current long term evolution (LTE) system or a long term evolution-advanced (LTE-A) system, or may be applied to a currently formulated 5G network or another future network. It is clear that the communication system may further be applied to an LTE and 5G hybrid networking system or another system. This is not specifically limited in this embodiment of this application. In different networks, the access network device and the terminal in the foregoing communication system may correspond to different names. A person skilled in the art may understand that the names do not constitute limitations on the devices.

The vehicle to everything (V2X) communication system supports a broadcast mode, a multicast mode, and a unicast mode. The broadcast mode means that a sending terminal sends a transport block in the broadcast mode, and all receiving terminals can parse sidelink control information (SCI) and sidelink shared channel (SSCH) information. The SCI does not need to be scrambled, or the SCI is scrambled by using scrambling code known to all the receiving terminals. The multicast mode means that the sending terminal broadcasts a transport block, and the transport block carries a multicast identifier (ID). The receiving terminal parses the SCI and the SSCH based on the multicast ID. The unicast mode means that one sending terminal sends a transport block to one receiving terminal, and other receiving terminals cannot parse the SCI and the SSCH. In some embodiments of this application, the receiving terminal serves as a first terminal, and the sending terminal serves as a second terminal. This is uniformly described herein, and details are not described again below.

An embodiment of this application provides a communication method, applied to a process of data transmission between terminals.

Figure 8:
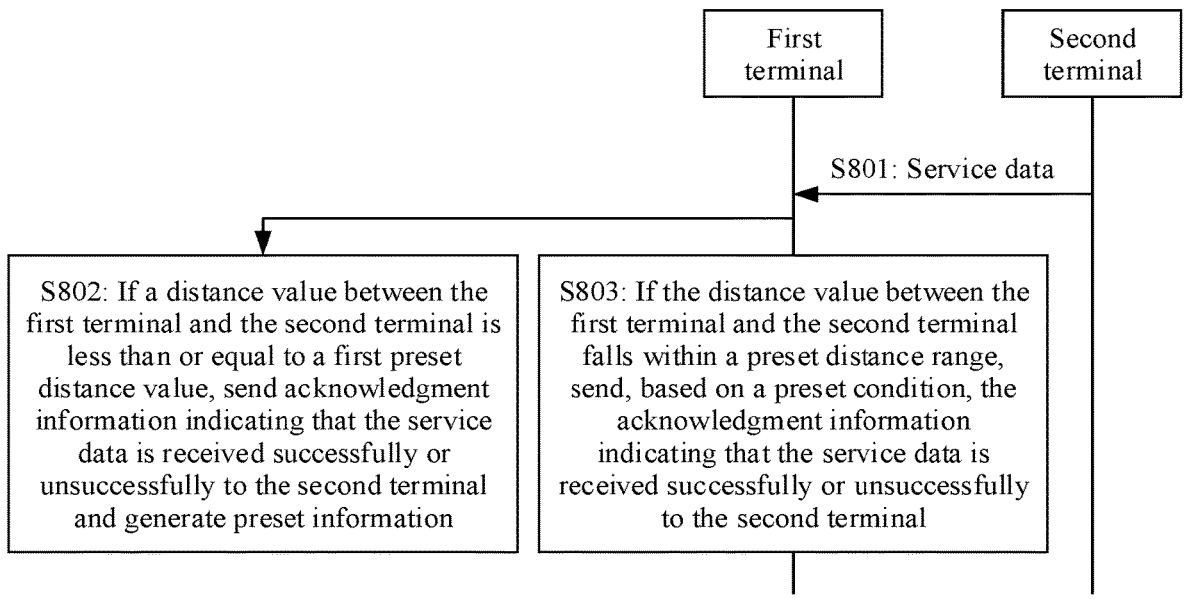
FIG. 8 is a flowchart of a communication method according to an embodiment of this application.

The following describes the communication method provided in this embodiment of this application by using an example in which a second terminal sends service data to a first terminal in a multicast manner. As shown in FIG. 8, the communication method in this embodiment of this application includes the following steps.

S801: The second terminal sends the service data to the first terminal. Correspondingly, the first terminal receives the service data from the second terminal.

The first terminal first parses a physical sidelink control channel (PSCCH) to obtain sidelink control information (SCI), and demodulates and decodes a physical sidelink shared channel (PSSCH) based on the SCI, to obtain the service data.

The service data may be information in different service scenarios. The service data is transmitted in a form of a transport block. In an actual service scenario, different preset distance ranges have different requirements on reliability of data transmission between terminals.

For example, in an anti-collision service scenario, the service data includes location information of the second terminal. The distance value between the first terminal and the second terminal falls within a specific preset distance range, and reliability of data transmission between the first terminal and the second terminal needs to be ensured. Therefore, the first terminal adjusts a driving speed based on the location information of the second terminal, to avoid vehicles corresponding to the first terminal and the second terminal collide. However, when the distance value between the first terminal and the second terminal falls beyond the specific preset distance range, for example, when the distance value between the first terminal and the second terminal is very large, a probability that the vehicles corresponding to the first terminal and the second terminal collide is low. Correspondingly, the requirement on the reliability of data transmission between terminals is low.

Figure 9:
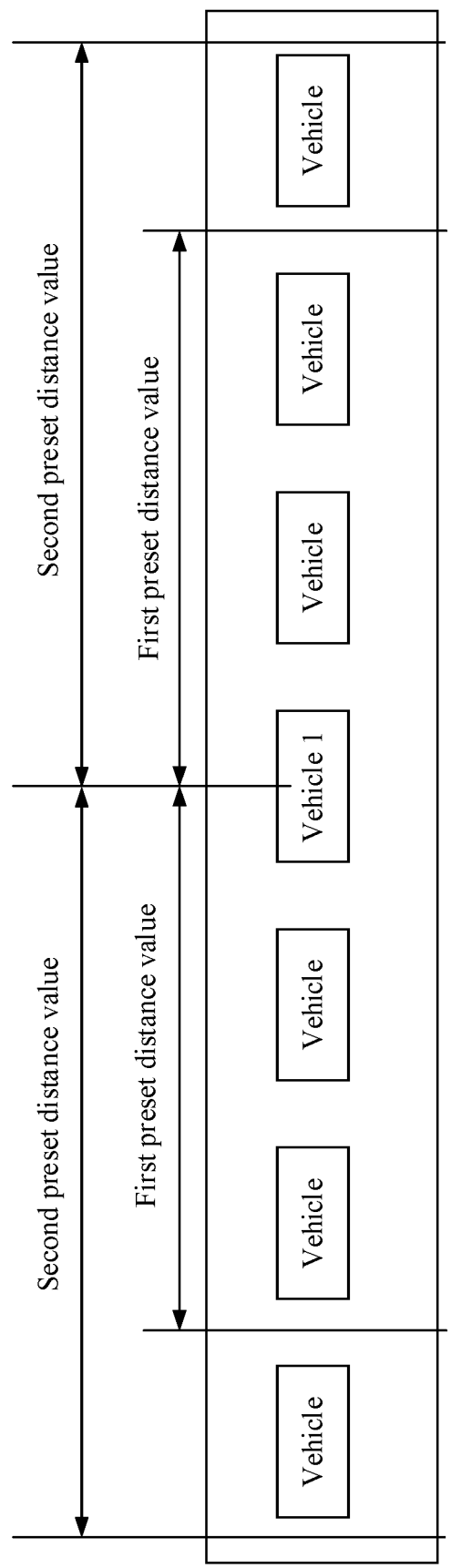
FIG. 9 is a schematic diagram of a distance-based quality-of-service requirement service scenario according to an embodiment of this application.

After performing S801, the first terminal performs different steps based on a location of the first terminal. Refer to FIG. 9. For example, an area in which the distance value between the first terminal and the second terminal (a vehicle 1) is equal to a first preset distance value is referred to as an assurance area, and an area in which the distance value between the first terminal and the second terminal (the vehicle 1) is greater than the first preset distance value and is less than or equal to a second preset distance value is referred to as a transition area. A range determined based on the first preset distance value and the second preset distance value is referred to as a preset distance range. If the first terminal determines that the distance value between the first terminal and the second terminal is less than or equal to the first preset distance value (that is, the first terminal is in the assurance area), the first terminal performs S802. If the first terminal determines that the distance value between the first terminal and the second terminal falls within the preset distance range (that is, the first terminal is in the transition area), the first terminal performs S803.

S802: If the distance value between the first terminal and the second terminal is less than or equal to the first preset distance value, the first terminal sends acknowledgment information indicating that the service data is received successfully or unsuccessfully to the second terminal, and generates preset information.

The first preset distance value can indicate a value of a required communication distance. A range of the required communication distance may be an area range corresponding to a distance less than or equal to the first preset distance value. The first preset distance value is related to a service scenario. The first preset distance value varies with different service scenarios. An area corresponding to the first preset distance value may be referred to as an assurance area. For example, in the anti-collision service scenario, the first preset distance value is an area range in which a distance between the first terminal and the second terminal falls within 1000 meters.

The first preset distance value may indicate a separation length value in space by using different physical quantities. For example, the first preset distance value may be indicated by using a physical quantity, namely, length. The first preset distance value indicates that the distance between the first terminal and the second terminal is 1000 meters. In this case, the area range indicated by the first preset distance value is the area range in which the distance between the first terminal and the second terminal falls within 1000 meters. For another example, the first preset distance value may be indicated by using a physical quantity, namely, "reference signal received power". That the first preset distance value is −80 dB indicates an area range in which a reference signal received power value of the second terminal is greater than or equal to −80 dB.

When the distance value between the first terminal and the second terminal is less than or equal to the first preset distance value, it indicates that the first terminal is in the assurance area. In this case, a requirement on quality of transmitting the service data between the terminals is high, and the first terminal needs to send the acknowledgment information indicating that the service data is received successfully or unsuccessfully to the second terminal, to ensure data transmission efficiency.

The preset information is a statistical indicator corresponding to a preset condition. For example, when the preset condition is related to a preset time parameter, the generating preset information may specifically be: updating a first time point, that is, updating a time point at which the distance value is determined by the first terminal to be less than or equal to the first preset distance value. For another example, when the preset condition is related to a retransmitted transport block, the generating preset information may specifically be: identifying whether the transport block is a newly transmitted transport block. For still another example, when the preset condition is related to a block error rate threshold, the generating preset information may specifically be: updating a current block error rate.

When sending the acknowledgment information indicating that the service data is received successfully or unsuccessfully to the second terminal, the first terminal may use a feedback manner of ACK/NACK. To be specific, when the service data is received successfully, the first terminal sends acknowledgment ACK information to the second terminal. When the service data is received unsuccessfully, the first terminal sends negative acknowledgment NACK information to the second terminal. The first terminal may alternatively use a feedback manner of NACK only. To be specific, when the service data is received successfully, the first terminal does not send any information to the second terminal. When the service data is received unsuccessfully, the first terminal sends negative acknowledgment NACK information to the second terminal. The first terminal receives the sidelink control information from the second terminal, where the sidelink control information carries indication information of a feedback manner, to notify the first terminal of the feedback manner used when the first terminal feeds back HARQ information.

S803: If the distance value between the first terminal and the second terminal falls within the preset distance range, the first terminal sends, based on the preset condition, the acknowledgment information indicating that the service data is received successfully or unsuccessfully to the second terminal.

The preset distance range is determined based on the first preset distance value and the second preset distance value, and the second preset distance value is greater than the first preset distance value. The preset distance range varies with different service scenarios. An area corresponding to the preset distance range may be referred to as a transition area. For example, in the anti-collision service scenario, the preset distance range is an area range in which the distance between the first terminal and the second terminal falls within 1000 meters to 1100 meters.

The second preset distance value is a value determined based on a service scenario, and the second preset distance value may alternatively be an infinite value. When the second preset distance value is set to an infinite value, only whether the distance value is far less than the second preset distance value is determined. Similar to the first preset distance value, the second preset distance value may also indicate a separation length value in space by using different physical quantities. For example, when both the first preset distance value and the second preset distance value are indicated by using a physical quantity, namely, length. That the first preset distance value is 1000 indicates that the distance between the first terminal and the second terminal falls within an area range of 1000 meters, and that the second preset distance value is 1100 indicates that the distance between the first terminal and the second terminal falls within an area range of 1100 meters. In this case, that the preset distance range is an area range greater than 1000 and less than or equal to 1100 indicates that the distance between the first terminal and the second terminal falls within the area range between 1000 meters to 1100 meters. For another example, when both the first preset distance value and the second preset distance value are indicated by using a physical quantity, namely, reference signal received power. That the first preset distance value is −80 indicates an area range in which a reference signal received power value of the second terminal is greater than or equal to −80 dB, and that the second preset distance value is −95 indicates an area range in which a reference signal received power value of the second terminal is greater than or equal to −95 dB. In this case, the preset distance range is a range greater than −95 and less than or equal to −80, that is, an area range in which the reference signal received power value of the second terminal is greater than −95 dB and less than or equal to −80 dB.

For specific description about the first terminal sends the acknowledgment information indicating that the service data is received successfully or unsuccessfully to the second terminal, refer to related description in S802. Details are not described herein again.

There may be a plurality of preset conditions. Specifically, a condition in which the HARQ information needs to be fed back may be set from different aspects. For example, the preset condition may be that a time length between the first time point and a second time point is less than the preset time parameter. The first time point is a time point at which the distance value is recently determined to be less than or equal to the first preset distance value, and the second time point is a time point at which the distance value is recently determined to fall within the preset distance range. If the first terminal receives a retransmitted transport block, the preset condition may be that when the first terminal receives the transport block for the first time, the distance value is less than or equal to the first preset distance value. The preset condition may alternatively be that a block error rate is greater than the block error rate threshold.

In an embodiment of a first possible design, the preset condition includes that the time length between the first time point and the second time point is less than the preset time parameter T.

The first time point is a time point at which the distance value is recently determined to be less than or equal to the first preset distance value. During actual application, the first time point is a time point at which the first terminal receives the location information of the second terminal. For example, the first terminal receives a broadcast message, radio resource control (RRC) signaling, medium access control (MAC) signaling, or the like from an access network device, to obtain the location information of the second terminal. The first time point is a time point at which the first terminal recently receives the broadcast message, the RRC signaling, or the MAC signaling. For another example, the first terminal receives the sidelink control information (SCI) from the second terminal, to obtain the location information of the second terminal. The first time point is a time point at which the first terminal recently receives the SCI. The SCI carries the location information of the second terminal.

The second time point is a time point at which the distance value is recently determined to fall within the preset distance range.

Figure 10:
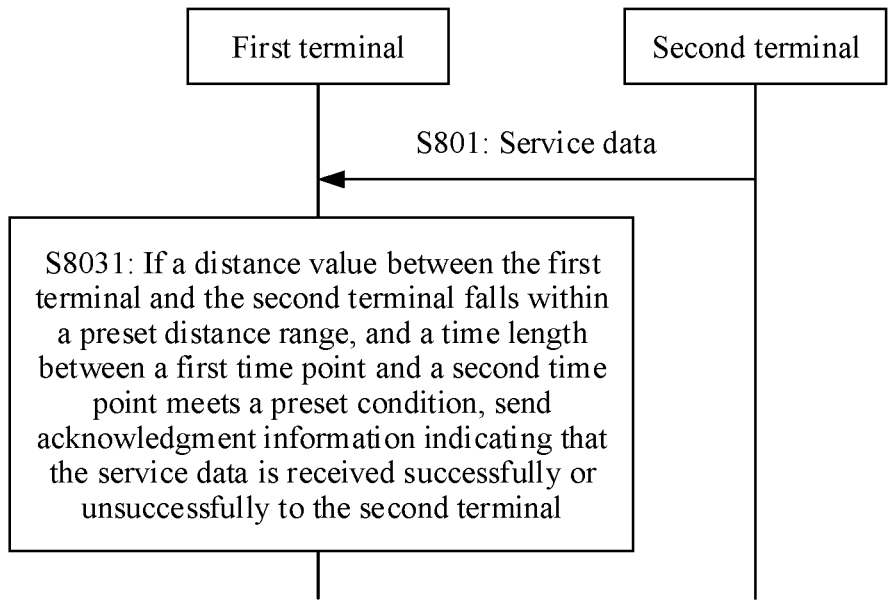
FIG. 10 to FIG. 12 are flowcharts of a communication method according to an embodiment of this application.

Refer to FIG. 10. In this case, a specific implementation process of S803 may include S8031.

S8031: If the distance value between the first terminal and the second terminal falls within the preset distance range, and the time length between the first time point and the second time point meets the preset condition, the first terminal sends the acknowledgment information indicating that the service data is received successfully or unsuccessfully to the second terminal.

In this way, when the first terminal determines that the distance value is less than or equal to the first preset distance value, it indicates that the first terminal is in the assurance area. In this case, if the first terminal receives the service data from the second terminal, the first terminal sends the acknowledgment information indicating that the service data is received successfully or unsuccessfully to the second terminal. When the time length between the first time point and the second time point meets the preset condition, it indicates that a time length from the distance value that is between the first terminal and the second terminal and that is less than or equal to the first preset distance value to the distance value that is between the first terminal and the second terminal and that falls within the preset distance range is less than or equal to the preset time parameter T, that is, a time length in which the first terminal enters a transition area from the assurance area does not exceed the preset time parameter T. In this case, if the first terminal receives the service data from the second terminal, the first terminal also sends the acknowledgment information indicating that the service data is received successfully or unsuccessfully to the second terminal, to ensure data transmission efficiency. When the time length between the first time point and the second time point meets the preset condition, the first terminal sends the acknowledgment information indicating that the service data is received successfully or unsuccessfully to the second terminal. Therefore, even a frequency of exchanging location information between the first terminal and the second terminal decreases, data transmission efficiency can also be ensured. In addition, in a scenario in which an actual distance value between the first terminal and the second terminal is less than or equal to the first preset distance value, the first terminal can correctly determine at least once that the distance value is less than or equal to the first preset distance value, and a time point at which the first terminal determines that the distance value is less than or equal to the first preset distance value is denoted as the first time point. Even if the first terminal incorrectly calculates the distance value in a next time or several times, and the actual distance value between the first terminal and the second terminal is not reflected, for example, the first terminal determines that the distance value falls within the preset distance range, instead of determining that the distance value is less than or equal to the first preset distance value, a time point at which the first terminal determines that the distance value falls within the preset distance range is denoted as the second time point. As long as the time length between the first time point and the second time point does not exceed the preset time parameter T, when receiving the service data from the second terminal, the first terminal also sends the acknowledgment information indicating that the service data is received successfully or unsuccessfully to the second terminal. In this way, even the first terminal incorrectly calculates the distance value, data transmission efficiency can also be ensured. Even if the first terminal is in an area near the first preset distance value, quality of data transmission between the first terminal and the second terminal can also be ensured, and unnecessary data retransmission can further be avoided.

For example, the embodiment of the first possible design is described by using an example in which timing duration T of a timer is configured based on the preset time parameter.

The preset time parameter is used to configure the timer, the timing duration of the timer is T, and the first time point is a start time point of the timer. In other words, when determining that the distance value is less than or equal to the first preset distance value, the first terminal starts the timer. A specific implementation process of S8031 may include: If the distance value between the first terminal and the second terminal falls within the preset distance range, and the timer is in a running state, the first terminal sends the acknowledgment information indicating that the service data is received successfully or unsuccessfully to the second terminal.

Because the start time point of the timer is the first time point, if the timer is in the running state, it indicates that the time length between the first time point and the second time point meets the preset condition. In this case, when receiving the service data from the second terminal, the first terminal also sends the acknowledgment information indicating that the service data is received successfully or unsuccessfully to the second terminal, to ensure data transmission efficiency.

Figure 11:
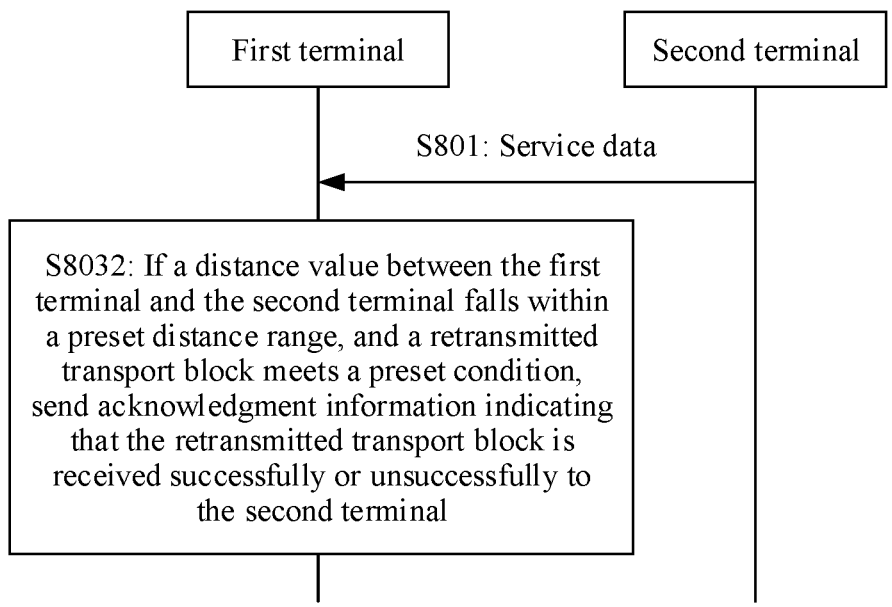

In an embodiment of a second possible design, the service data is service data retransmitted by the second terminal, and is transmitted in a form of a transport block. The preset condition includes that when the first terminal receives the transport block for the first time, the distance value is less than or equal to the first preset distance value. Refer to FIG. 11. In this case, a specific implementation process of S803 may include S8032.

S8032: If the distance value between the first terminal and the second terminal falls within the preset distance range, and the retransmitted transport block meets the preset condition, the first terminal sends the acknowledgment information indicating that the retransmitted transport block is received successfully or unsuccessfully to the second terminal.

The transport block received by the first terminal for the first time is a newly transmitted transport block, that is, the first terminal receives data transmitted by the second terminal for the first time. The retransmitted transport block is a transport block repeatedly transmitted by the second terminal, so that the first terminal receives the transport block again.

Each transport block corresponds to one piece of new transmission indication information, and the new transmission indication information is used to indicate whether the transport block is a transport block newly transmitted by the second terminal.

Herein, that the retransmitted transport block meets the preset condition indicates that the distance value between the first terminal and the second terminal is less than or equal to the first preset distance value, and when the first terminal unsuccessfully receives the transport block for the first time, and receives the retransmitted transport block from the second terminal, the distance value between the first terminal and the second terminal falls within the preset distance range. In this case, the first terminal also sends the acknowledgment information indicating that the retransmitted transport block is received successfully or unsuccessfully to the second terminal, to ensure data transmission efficiency.

Figure 12:
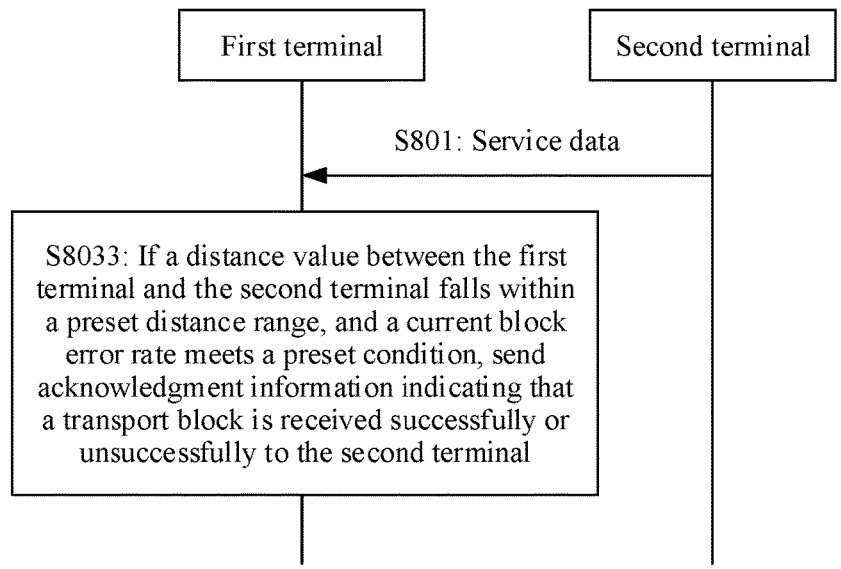

In an embodiment of a third possible design, the service data is transmitted in a form of a transport block. The preset condition includes that the block error rate is greater than the block error rate threshold. Refer to FIG. 12. In this case, a specific implementation process of S803 may include S8033.

S8033: If the distance value between the first terminal and the second terminal falls within the preset distance range, and the current block error rate meets the preset condition, the first terminal sends the acknowledgment information indicating that the transport block is received successfully or unsuccessfully to the second terminal.

The block error rate meets the following formula:

$$BLER = N\_error / N\_total \quad (1),$$ where

BLER indicates the block error rate, N_error indicates a quantity of transport blocks that are received unsuccessfully within a preset time period, and N_total indicates a quantity of transport blocks that are received within the preset time period; or N_error is a preset value, for example, 1024 or 2048.

The block error rate threshold may be a value determined by the access network device or the second terminal, or the block error rate threshold may be a value determined based on quality of service (quality of service, QoS) of a service type. For example, QoS of a service type requires a block error rate of 5%, and the block error rate threshold may be a multiple of the block error rate required by the QoS, that is, the block error rate threshold may be 10% or 15%. Alternatively, the block error rate may be set based on an offset and a requirement of original QoS. If the offset is 2%, and the block error rate required by the original QoS is 5%, the block error rate threshold may be 7%.

Figure 13:
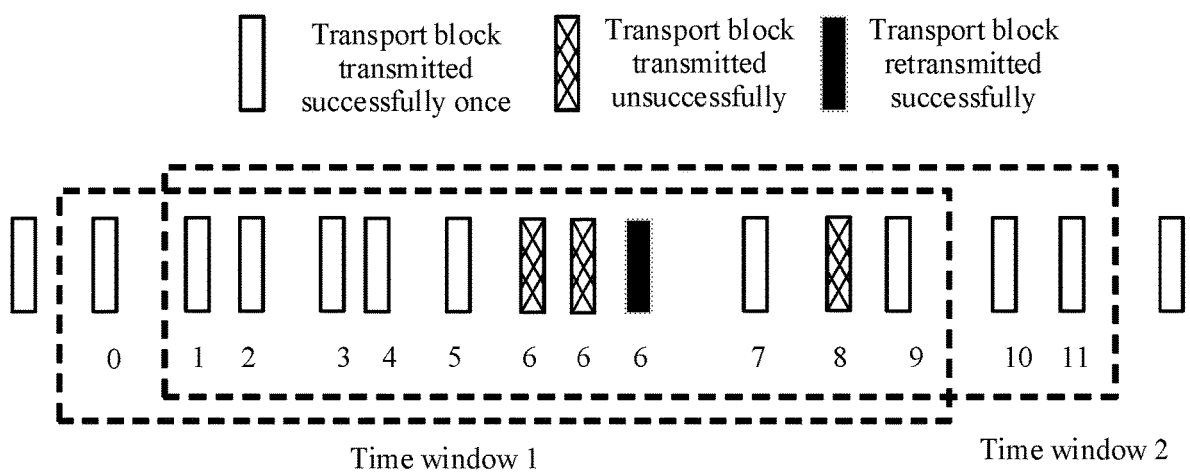
FIG. 13 is a schematic diagram of a block error rate calculation scenario according to an embodiment of this application.

Refer to FIG. 13. For example, FIG. 13 is a schematic diagram of block error rate calculation. In FIG. 13, lengths of preset time periods corresponding to a time window 1 and a time window 2 are 1 second. In the time window 1 and the time window 2, each transport block corresponds to a number. In the time window 1, 10 transport blocks are transmitted in total, and N_total=10. A quantity of transport blocks that are transmitted once and received successfully is 8, a transport block whose number is 6 is transmitted three times and received successfully finally, and a transport block whose number is 8 is transmitted once and received unsuccessfully finally. In this case, a transport block that is received unsuccessfully within the preset time period corresponding to the time window 1 is the transport block corresponding to the number 8, N_error=1, and BLER=10.00%. Similarly, in the time window 2, 11 transport blocks are transmitted in total, and N_total=11. A quantity of transport blocks that are transmitted once and received successfully is 9, a transport block whose number is 6 is transmitted three times and received successfully finally, and a transport block whose number is 8 is transmitted once and received unsuccessfully finally. In this case, a transport block that is received unsuccessfully within the preset time period corresponding to the time window 2 is the transport block corresponding to the number 8, N_error=1, and BLER=9.09%.

In this case, that the current block error rate meets the preset condition indicates that the current block error rate is greater than the block error rate threshold. In this case, when receiving the transport block from the second terminal, the first terminal sends the acknowledgment information indicating that the transport block is received successfully or unsuccessfully to the second terminal, to meet a transmission quality requirement of the service data.

Figure 14:
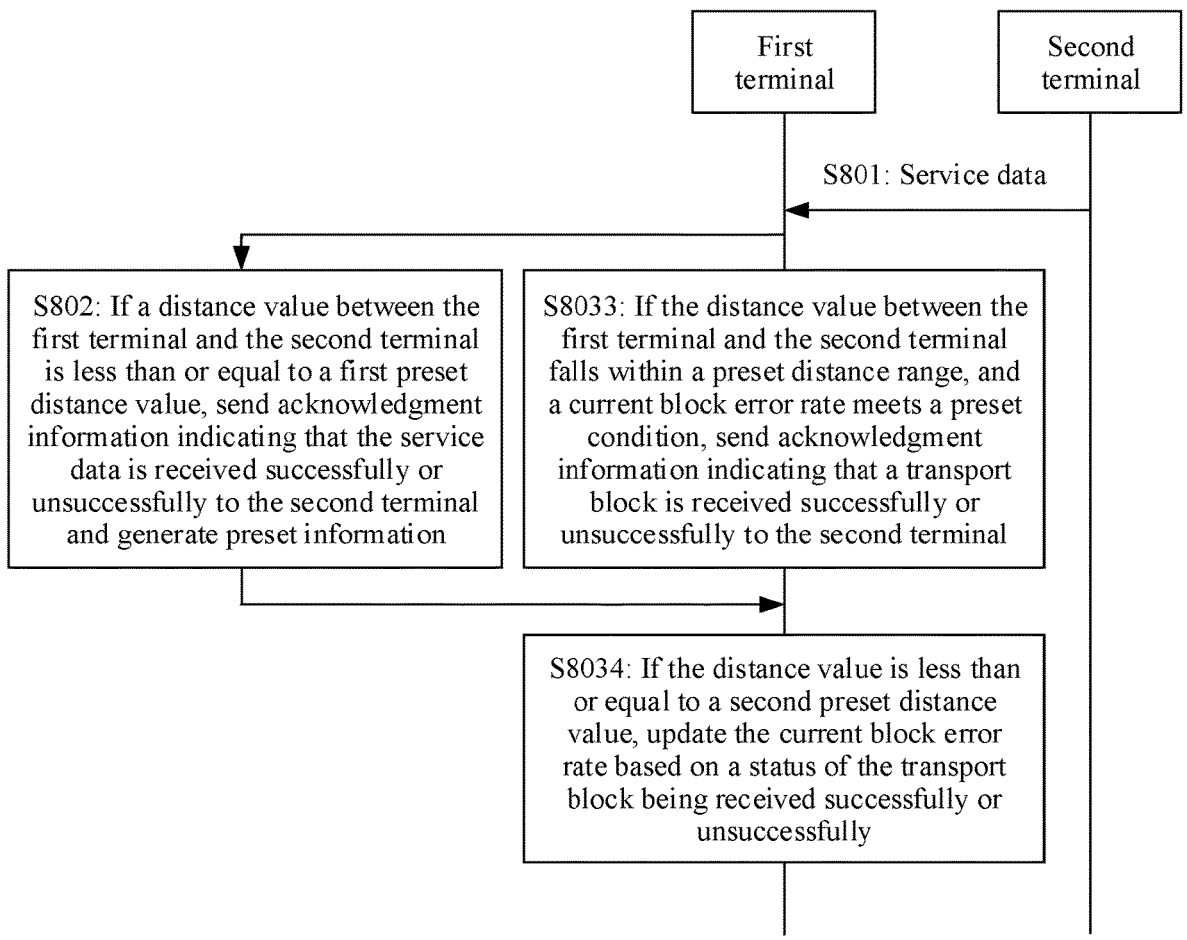
FIG. 14 to FIG. 18 are flowcharts of a communication method according to an embodiment of this application.

In addition, when the preset condition is related to the block error rate threshold, the first terminal needs to update the current block error rate in real time. Refer to FIG. 14. After performing S801, the first terminal needs to perform S8034.

S8034: If the distance value is less than or equal to the second preset distance value, the first terminal updates the current block error rate based on a status of the transport block being received successfully or unsuccessfully.

If the distance value is less than or equal to the first preset distance value, it indicates that the first terminal is in the assurance area. In this case, when receiving the transport block from the second terminal, the first terminal sends the status of the transport block being received successfully or unsuccessfully to the second terminal, and updates the current block error rate based on the status of the transport block being received successfully or unsuccessfully. Therefore, when the first terminal is in the transition area (in other words, the distance value falls within the preset distance range), the current block error rate is used as a basis for whether the first terminal feeds back the acknowledgment information.

If the distance value falls within the preset distance range, it indicates that the first terminal is in the transition area. Whether the current block error rate is greater than the block error rate threshold or not, the first terminal updates the current block error rate based on the status of the transport block being received successfully or unsuccessfully. Therefore, when the current block error rate is greater than the block error rate threshold, the first terminal sends the acknowledgment information indicating that the transport block is received successfully or unsuccessfully to the second terminal, to ensure a transmission quality requirement of the service data.

It should be noted that if the distance value is less than or equal to the first preset distance value, the first terminal needs to perform S802 and S8034. The first terminal may first perform S802 and then perform S8034, may first perform S8034 and then perform S802, or may simultaneously perform S802 and S034. A sequence of performing S802 and S8034 by the first terminal is not limited herein. Similarly, if the distance value falls within the preset distance range, the first terminal needs to perform S8033 and S8034. A sequence of performing S8033 and S8034 is not limited. The first terminal may first perform S8033 and then perform S8034, may first perform S8034 and then perform S8033, or may simultaneously perform S8033 and S034.

Figure 15:
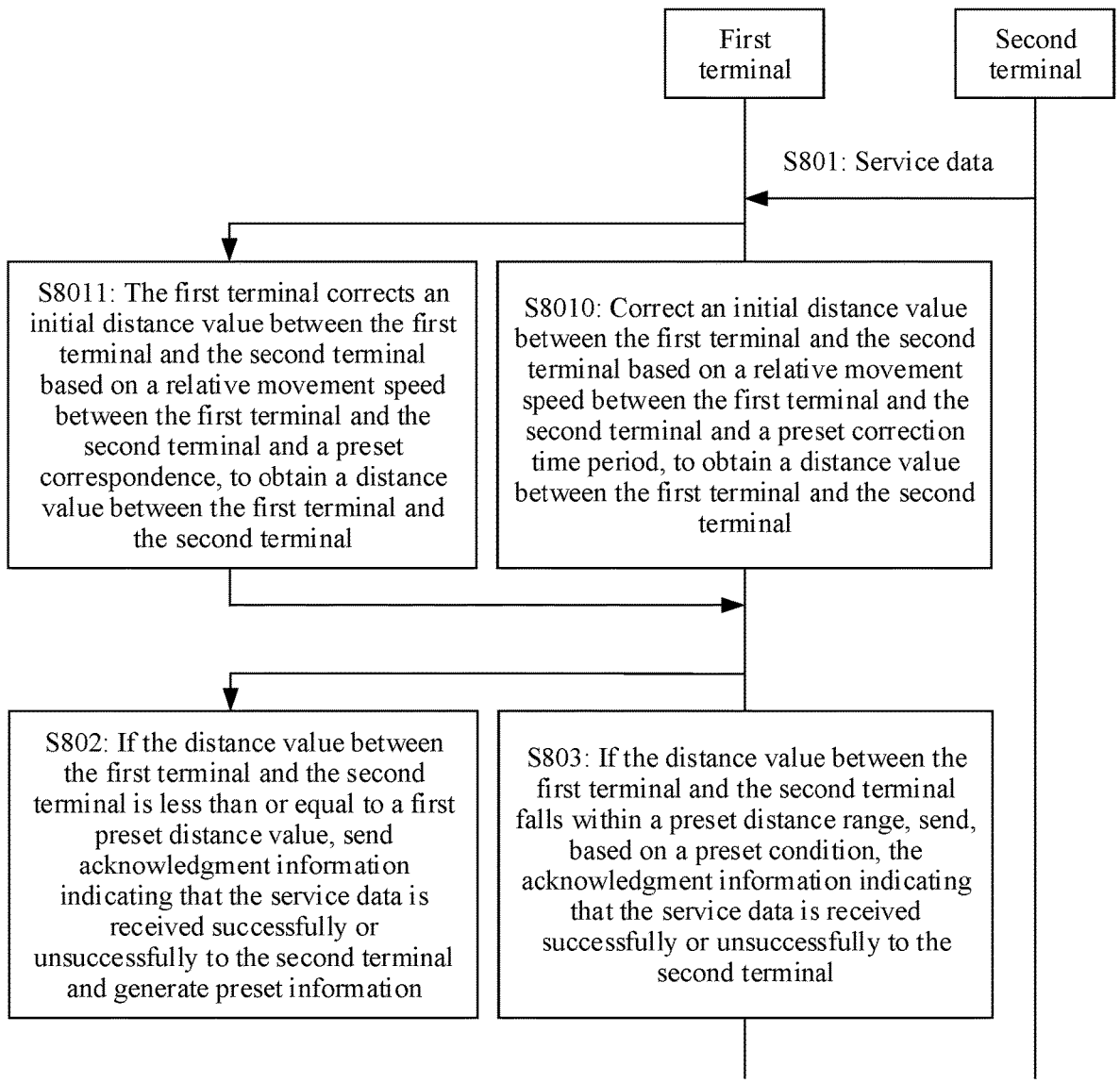

To improve accuracy of determining the location of the first terminal, for example, determining whether the first terminal is in the assurance area or the transition area, the distance value according to the communication method in this embodiment of this application is a corrected value. Refer to FIG. 15. A specific process in which the first terminal obtains the distance value may include S8010 or S8011. In a possible implementation, a specific process in which the first terminal obtains the distance value may include S8010.

S8010: The first terminal corrects an initial distance value between the first terminal and the second terminal based on a relative movement speed between the first terminal and the second terminal and a preset correction time period, to obtain the distance value between the first terminal and the second terminal.

The initial distance value may be a value obtained by the first terminal through calculation based on the location information of the first terminal and the location information of the second terminal. The initial distance value between the first terminal and the second terminal may also indicate a separation length value in space by using different physical quantities. For example, when the initial distance value is indicated by a physical quantity, namely, length, the first terminal receives the location information from the second terminal, and then calculates the initial distance value between the first terminal and the second terminal based on the location information of the first terminal and the location information of the second terminal. For another example, when the initial distance value is indicated by a physical quantity, namely, reference signal received power, the first terminal receives a signal from the second terminal, and the first terminal calculates reference signal received power of the received signal, to indicate the distance between the first terminal and the second terminal.

The relative movement speed between the first terminal and the second terminal is obtained based on actual movement speeds of the first terminal and the second terminal. For example, the first terminal receives the actual movement speed from the second terminal, and obtains the relative movement speed based on the actual movement speed of the first terminal.

The preset correction time period is related to a service scenario. For example, in the anti-collision service scenario, the preset correction time period is 5 seconds. The preset correction time period may be a parameter received by the first terminal from the access network device, a parameter received by the first terminal from the second terminal, or a parameter indicated by a network side during service establishment.

For example, when the physical quantity, namely, length, is used to indicate the initial distance value, the distance value between the first terminal and the second terminal meets the following formula:

$$A = e - v \times x \quad (2),\text{ where}$$

A indicates the distance value between the first terminal and the second terminal, e indicates the initial distance value between the first terminal and the second terminal, x indicates the preset correction time period, and v indicates the relative movement speed between the first terminal and the second terminal.

For example, in the anti-collision service scenario, the preset correction time period is x=5 seconds. At a moment, the initial distance value obtained by the first terminal through calculation is e=1000 meters, and the relative movement speed between the first terminal and the second terminal is v=10 m/s. According to the formula (2), A=950 meters may be obtained.

For example, when the physical quantity, namely, reference signal received power, is used to indicate the initial distance value, the distance value between the first terminal and the second terminal meets the following formula:

$$A = a - 20\log_{10}(v \times x/e + 1) \quad (3),\text{ where}$$

A indicates corrected reference signal received power, a indicates reference signal received power before correction, e indicates the initial distance value between the first terminal and the second terminal, x indicates the preset correction time period, and v indicates the relative movement speed between the first terminal and the second terminal. The first terminal may obtain the distance value between the first terminal and the second terminal based on the corrected reference signal received power.

In this way, the first terminal corrects the initial distance value between the first terminal and the second terminal based on the relative movement speed between the first terminal and the second terminal and the preset correction time period, to obtain the distance value between the first terminal and the second terminal. The second terminal does not need to frequently send location information to the first terminal, thereby saving time-frequency resources.

In another possible implementation, a specific process in which the first terminal obtains the distance value may include S8011.

S8011: The first terminal corrects an initial distance value between the first terminal and the second terminal based on a relative movement speed between the first terminal and the second terminal and a preset correspondence, to obtain the distance value between the first terminal and the second terminal.

For both the relative movement speed and the initial distance value, refer to related description in S8010. Details are not described herein again.

The preset correspondence is a correspondence between the relative movement speed and a reference signal received power adjustment amount.

Refer to Table 1. For example, Table 1 shows a correspondence between the relative movement speed and the reference signal received power adjustment amount. In Table 1, if the first terminal determines that the relative movement speed v=0.35 km/s, and v is greater than 0.3, in this case, the reference signal received power correction amount is 5 dB.

TABLE 1

| | Relative movement speed (km/s) | | | | | |
|---|---|---|---|---|---|---|
| | v > 0.3 | v = 0.3 | 0.3 > v ≥ 0.25 | 0.25 > v ≥ 0.2 | 0.2 > v ≥ 0.1 | 0.1 > v ≥ 0.05 | 0.05 > v ≥ 0 |
| Reference signal received power correction amount (dB) | 5 | 4 | 3.5 | 3 | 2 | 1 | 0 |

For example, the corrected reference signal received power meets the following formula:

$$A = a - \Delta \quad (4)$$

where A indicates the corrected reference signal received power, a indicates the reference signal received power before correction, and $\Delta$ indicates the reference signal received power correction amount. The first terminal may obtain the distance value between the first terminal and the second terminal based on the corrected reference signal received power.

In this way, the first terminal corrects the initial distance value between the first terminal and the second terminal based on the relative movement speed between the first terminal and the second terminal and the preset correspondence, to obtain the distance value between the first terminal and the second terminal. The second terminal does not need to frequently send location information to the first terminal, thereby saving time-frequency resources.

Figure 16:
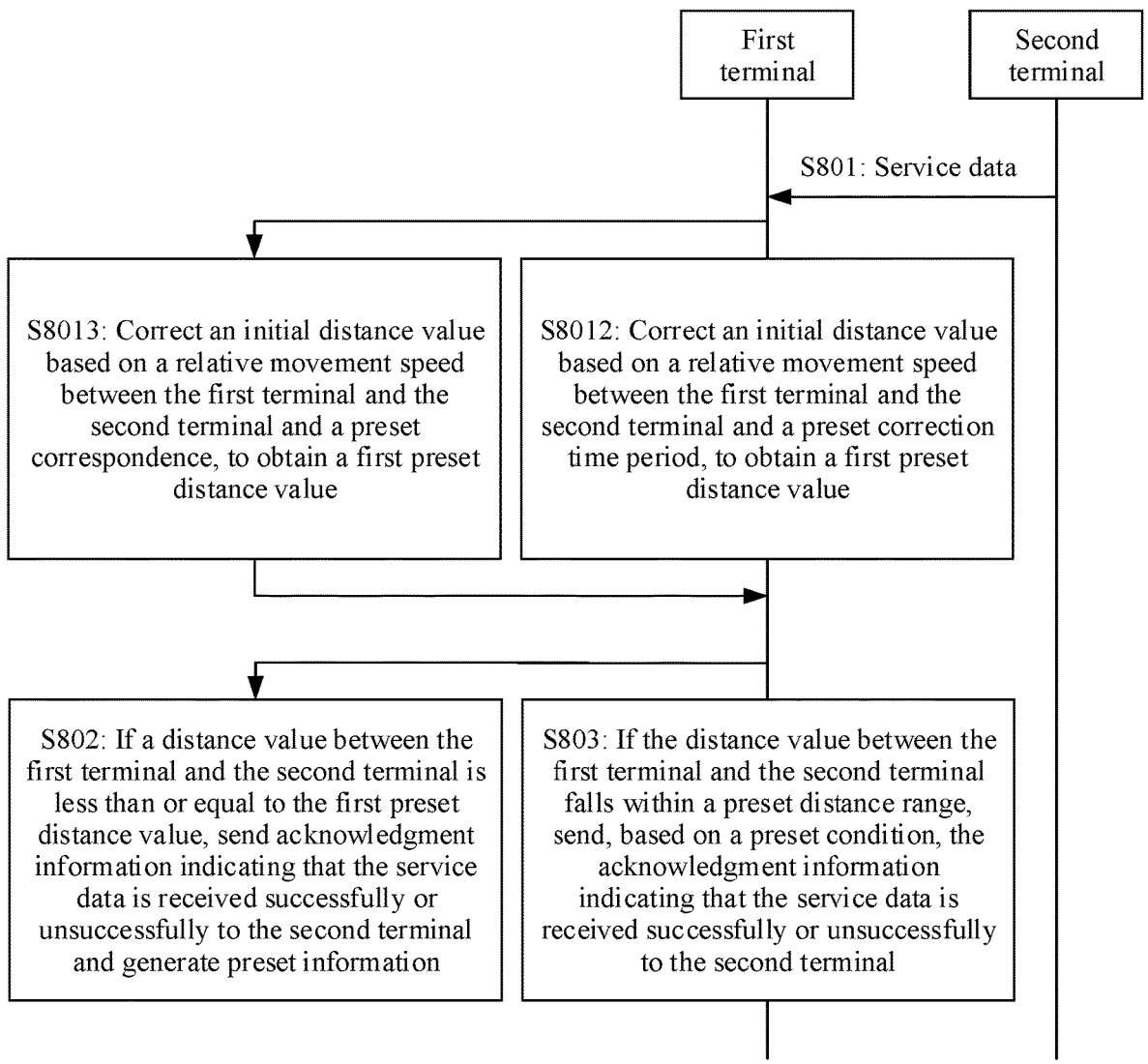

Similarly, the first preset distance value is also a corrected value. Refer to FIG. 16. A specific process in which the first terminal obtains the first preset distance value may include S8012 or S8013. In a possible implementation, a specific process in which the first terminal obtains the first preset distance value may include S8012.

S8012: The first terminal corrects the initial distance value based on the relative movement speed between the first terminal and the second terminal and the preset correction time period, to obtain the first preset distance value.

The initial distance value is used to indicate a size of the assurance area, and may also indicate a separation length value in space by using different physical quantities. For example, the initial distance value may be indicated by using a physical quantity, namely, length, or may be indicated by using a physical quantity, namely, reference signal received power.

For both the relative movement speed between the first terminal and the second terminal and the preset correction time period, refer to related description in S8010. Details are not described herein again.

For example, when the physical quantity, namely, length, is used to indicate the initial distance value, the first preset distance value meets the following formula:

$$B = b + v \times x \quad (5)$$

where B indicates the first preset distance value, b indicates the initial distance value, x indicates the preset correction time period, and v indicates the relative movement speed between the first terminal and the second terminal.

For example, in the anti-collision service scenario, the preset correction time period is x=5 seconds. At a moment, the initial distance value obtained by the first terminal is b=1000 meters, and the relative movement speed between the first terminal and the second terminal is v=10 m/s. According to the formula (5), B=1050 meters may be obtained.

For example, when the physical quantity, namely, reference signal received power, is used to indicate the initial distance value, the first preset distance value meets the following formula:

$$B = b + 20 \log_{10}(v \times x/d + 1) \quad (6)$$

where B indicates corrected reference signal received power, b indicates reference signal received power before correction, d indicates the initial distance value, x indicates the preset correction time period, and v indicates the relative movement speed between the first terminal and the second terminal. The first terminal may obtain the first preset distance value based on the corrected reference signal received power.

In this way, the first terminal corrects the initial distance value based on the relative movement speed between the first terminal and the second terminal and the preset correction time period, to obtain the first preset distance value. The second terminal does not need to frequently send location information to the first terminal, thereby saving time-frequency resources.

In another possible implementation, a specific process in which the first terminal obtains the distance value may include S8013.

S8013: The first terminal corrects the initial distance value based on the relative movement speed between the first terminal and the second terminal and the preset correspondence, to obtain the first preset distance value.

For both the relative movement speed and the initial distance value, refer to related description in S8010. Details are not described herein again.

The preset correspondence is a correspondence between the relative movement speed and a reference signal received power adjustment amount. For details, refer to a correspondence shown in Table 1.

For example, the corrected reference signal received power meets the following formula:

$$B = b - \Delta \quad (7),\text{ where}$$

B indicates the corrected reference signal received power, b indicates the reference signal received power before correction, and A indicates the reference signal received power correction amount. The first terminal may obtain the first preset distance value based on the corrected reference signal received power.

In this way, the first terminal corrects the initial distance value based on the relative movement speed between the first terminal and the second terminal and the preset correspondence, to obtain the first preset distance value. The second terminal does not need to frequently send location information to the first terminal, thereby saving time-frequency resources.

It should be noted that the first terminal may first correct the initial distance value between the first terminal and the second terminal, to obtain the distance value between the first terminal and the second terminal, and then correct the initial distance value used to indicate the size of the assurance area, to obtain the first preset distance value. In other words, the first terminal first performs S8010 or S8011, and then performs S8012 or S8013. Alternatively, the first terminal may first correct the initial distance value used to indicate the size of the assurance area, to obtain the first preset distance value, and then correct the initial distance value between the first terminal and the second terminal, to obtain the distance value between the first terminal and the second terminal. In other words, the first terminal first performs S8012 or S8013, and then performs S8010 or S8011. Alternatively, the first terminal may simultaneously correct both the initial distance value between the first terminal and the second terminal and the initial distance value used to indicate the size of the assurance area. In other words, the first terminal simultaneously performs S8010 or S8011 and S8012 or S8013. A sequence of performing S8010 to S8013 by the first terminal is not limited herein.

According to the communication method in this embodiment of this application, the first terminal receives the service data from the second terminal; and if the distance value between the first terminal and the second terminal falls within the preset distance range, the first terminal sends, based on the preset condition, the acknowledgment information indicating that the service data is received successfully or unsuccessfully to the second terminal. The preset distance range is determined based on the first preset distance value and the second preset distance value, and the second preset distance value is greater than the first preset distance value. In the conventional technology, when the first terminal is not in the assurance area (in other words, the distance value between the first terminal and the second terminal is greater than the first preset distance value), the acknowledgment information indicating that the service data is received successfully or unsuccessfully is not sent to the second terminal. The distance value is calculated inaccurately, and consequently transmission quality of the service data is affected. According to the communication method in this embodiment of this application, even if the first terminal is not in the assurance area, for example, the first terminal falls within the preset distance range, when the preset condition is met, the first terminal may send the acknowledgment information indicating that the service data is received successfully or unsuccessfully to the second terminal. This can ensure the transmission quality of the service data, and can avoid a case in which all first terminals within the preset distance range need to feed back acknowledgment information, to avoid unnecessary data transmission.

Figure 17:
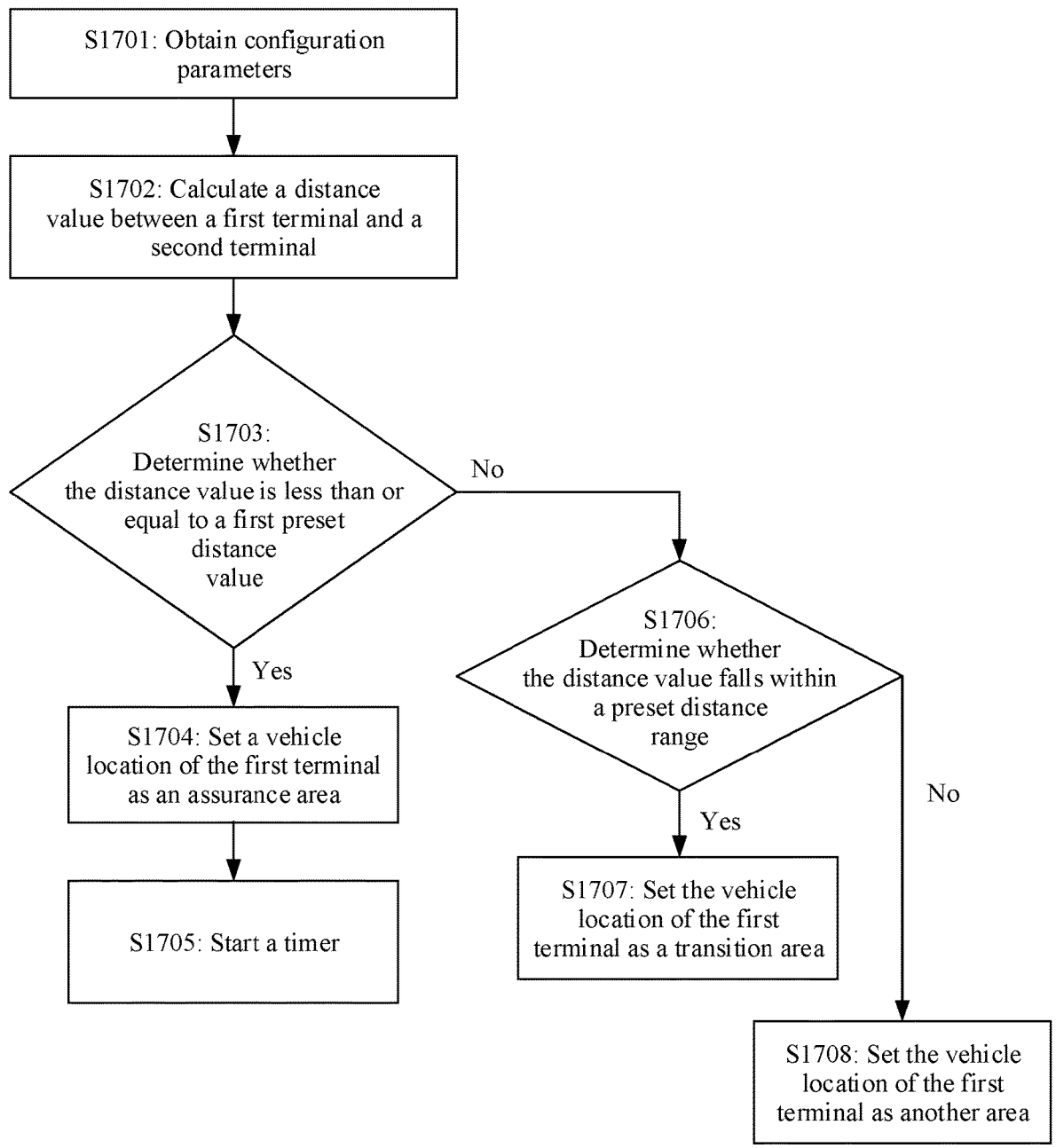

The following uses an example in which the preset condition is set based on the preset time parameter T and the first terminal uses the feedback manner of NACK only. The communication method in this embodiment of this application may include: The first terminal determines a range of a vehicle location of the first terminal, and feeds back the HARQ information. Refer to FIG. 17. An embodiment of a process in which the first terminal determines a range of a vehicle location of the first terminal may include the following steps.

S1701: The first terminal obtains configuration parameters.

The configuration parameters include the preset correction time period, the first preset distance value, and the second preset distance value.

For example, the preset correction time period is 5 seconds, the first preset distance value is 1000 meters, and the second preset distance value is 1100 meters.

S1702: The first terminal calculates the distance value between the first terminal and the second terminal.

For a specific implementation process of S1702, refer to related description in S8010. Details are not described herein again.

S1703: The first terminal determines whether the distance value between the first terminal and the second terminal is less than or equal to the first preset distance value; and if the distance value between the first terminal and the second terminal is less than or equal to the first preset distance value, performs S1704 and S1705; or if the distance value between the first terminal and the second terminal is not less than or equal to the first preset distance value, performs S1706.

S1704: The first terminal sets the vehicle location of the first terminal as the assurance area.

S1705: The first terminal starts the timer. The timing duration of the timer is set based on the preset time parameter T.

For example, the preset time parameter T is 7 milliseconds.

S1706: The first terminal determines whether the distance value between the first terminal and the second terminal falls within the preset distance range; and if the distance value between the first terminal and the second terminal falls within the preset distance range, performs S1707; or if the distance value between the first terminal and the second terminal does not fall within the preset distance range, performs S1708.

S1707: The first terminal sets the vehicle location of the first terminal as the transition area.

S1708: The first terminal sets the vehicle location of the first terminal as another area.

Figure 18:
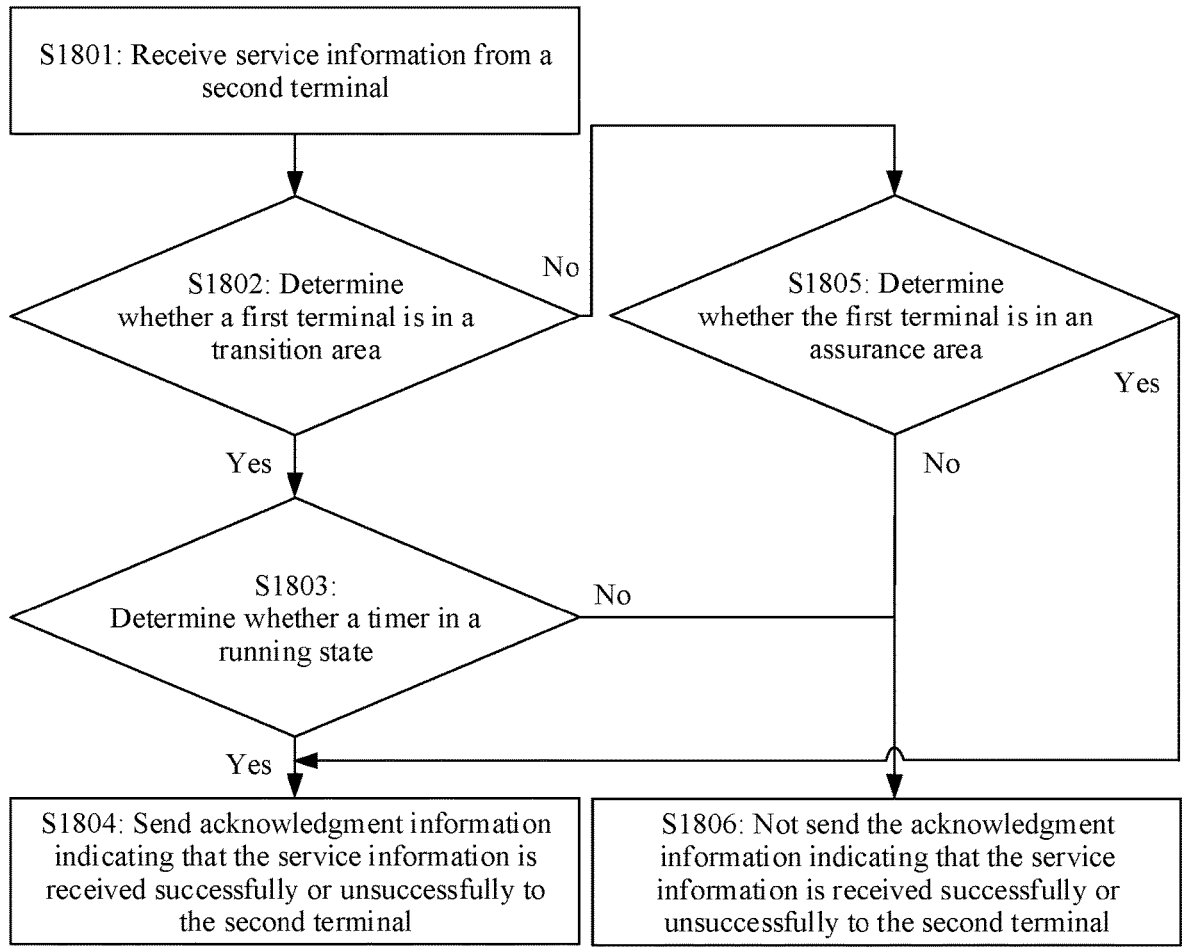

Refer to FIG. 18. An embodiment of a process in which the first terminal feeds back the HARQ information may include the following steps.

S1801: The first terminal receives the service data from the second terminal.

For a specific implementation process of S1801, refer to related description in S801. Details are not described herein again.

S1802: The first terminal determines whether the first terminal is in the transition area; and if the first terminal is in the transition area, performs S1803; or if the first terminal is not in the transition area, performs S1805.

S1803: The first terminal determines whether the timer is in a running state; and if the timer is in a running state, performs S1804; or if the timer is not in a running state, performs S1806.

S1804: The first terminal sends the acknowledgment information indicating that the service data is received successfully or unsuccessfully to the second terminal.

For example, if the service data is received successfully, the first terminal does not send any information to the second terminal. If the service data is received unsuccessfully, the first terminal sends NACK to the second terminal.

S1805: The first terminal determines whether the first terminal is in the assurance area; and if the first terminal is in the assurance area, performs S1804; or if the first terminal is not in the assurance area, performs S1806.

S1806: The first terminal does not send the acknowledgment information indicating that the service data is received successfully or unsuccessfully to the second terminal.

Figure 19:
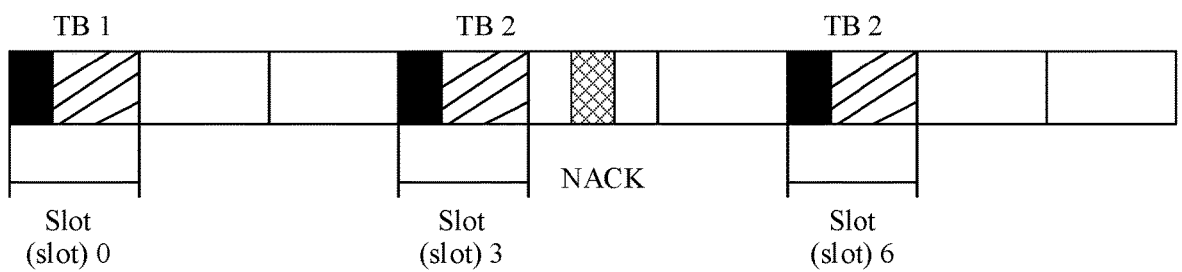
FIG. 19 is a schematic diagram of feedback effects of HARQ information according to an embodiment of this application.

Refer to FIG. 19. For example, FIG. 19 is a schematic diagram of feedback effects of the HARQ information. At a moment corresponding to a slot 0, the first terminal is in the assurance area, and successfully receives a transport block TB 1 from the second terminal. In this case, the first terminal starts the timer.

At a moment corresponding to a slot 3, the first terminal is in the transition area, and unsuccessfully receives a transport block TB 2 from the second terminal. In this case, the first terminal determines that the timer does not expire, and feeds back the NACK to the second terminal.

At a moment corresponding to a slot 6, the first terminal is still in the transition area, and successfully receives the retransmitted transport block TB 2 from the second terminal.

In this way, if the first terminal is located at an edge between the assurance area and the transition area, the first terminal determines, based on the running state of the timer, whether to send the HARQ information to the second terminal, to ensure data transmission quality. In a scenario in which all first terminals in the transition area need to feed back the HARQ information, the first terminal determines, based on the running state of the timer, whether to send the HARQ information to the second terminal, to avoid unnecessary data retransmission.

Figure 20:
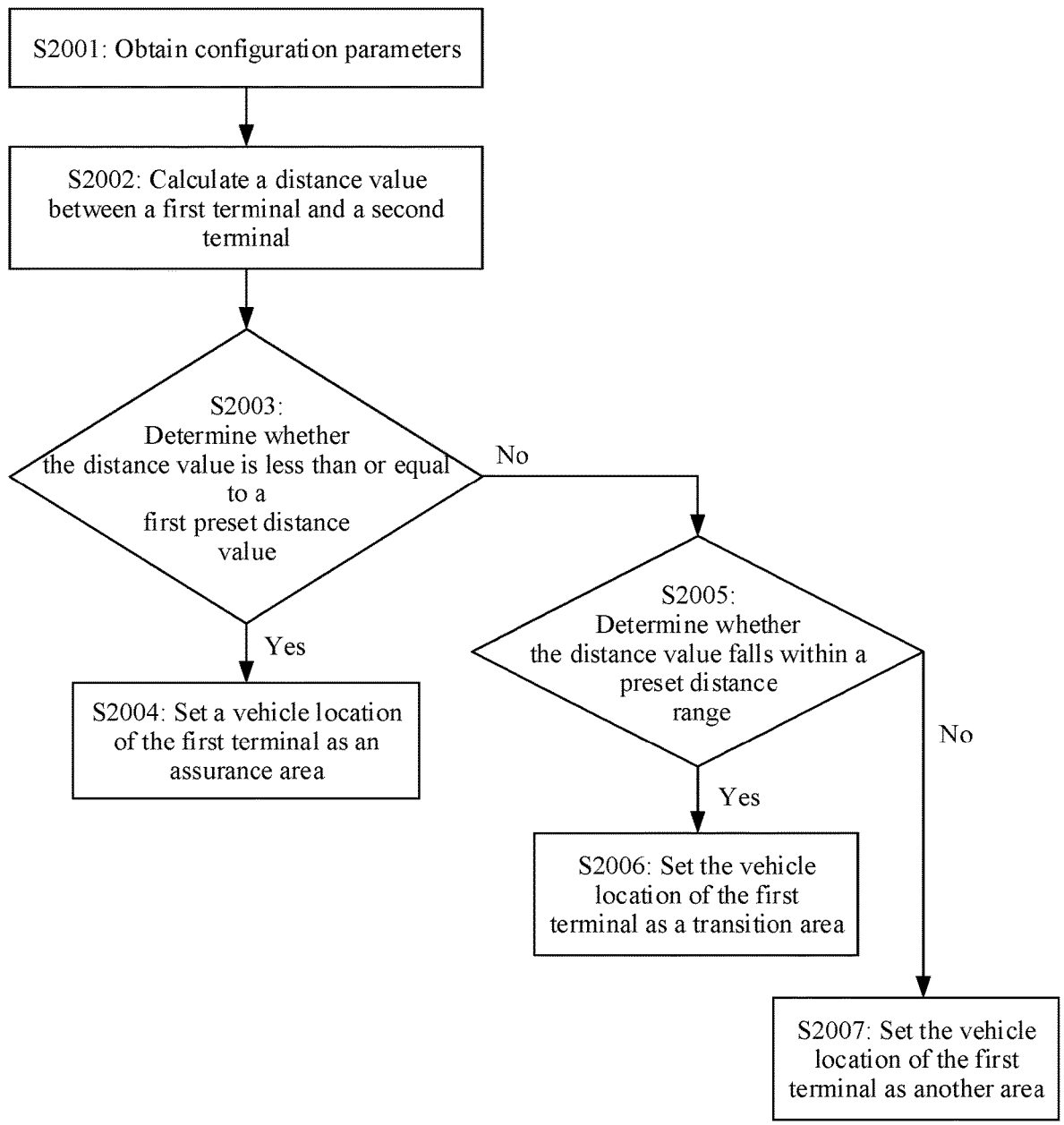
FIG. 20 and FIG. 21 are flowcharts of a communication method according to an embodiment of this application.

The following uses an example in which the preset condition is set based on a transport block transmitted for the first time and the first terminal uses the feedback manner of NACK only. The communication method in this embodiment of this application may include: The first terminal determines a range of a vehicle location of the first terminal, and feeds back the HARQ information. Refer to FIG. 20. A specific implementation process in which the first terminal determines a range of a vehicle location of the first terminal may include the following steps.

S2001: The first terminal obtains configuration parameters.

The configuration parameters include the preset correction time period, the first preset distance value, a first threshold, and a second threshold.

For example, the preset correction time period is 5 seconds, the first preset distance value is 1000 meters, the first threshold is −80 dbm, and the second threshold is −95 dbm.

S2002: The first terminal calculates the distance value between the first terminal and the second terminal.

The distance value is a value that indicates a distance by using the reference signal received power. For example, a reference signal may be a positioning reference signal (PRS), a channel state information reference signal (CSI-RS), and a demodulation reference signal (DMRS).

For a specific implementation process of S2002, refer to related description in S8010 or S8011. Details are not described herein again.

S2003: The first terminal determines whether the distance value between the first terminal and the second terminal is less than or equal to the first preset distance value; and if the distance value between the first terminal and the second terminal is less than or equal to the first preset distance value, performs S2004; or if the distance value between the first terminal and the second terminal is not less than or equal to the first preset distance value, performs S2005.

For example, the first terminal compares reference signal received power between the first terminal and the second terminal with the first threshold, to determine whether the distance value is less than or equal to the first preset distance value.

S2004: The first terminal sets the vehicle location of the first terminal as the assurance area.

S2005: The first terminal determines whether the distance value between the first terminal and the second terminal falls within the preset distance range; and if the distance value between the first terminal and the second terminal falls within the preset distance range, performs S2006; or if the distance value between the first terminal and the second terminal does not fall within the preset distance range, performs S2007.

For example, the first terminal separately compares the reference signal received power between the first terminal and the second terminal with the first threshold and the second threshold, to determine whether the distance value falls within the preset distance range.

S2006: The first terminal sets the vehicle location of the first terminal as the transition area.

S2007: The first terminal sets the vehicle location of the first terminal as another area.

Figure 21:
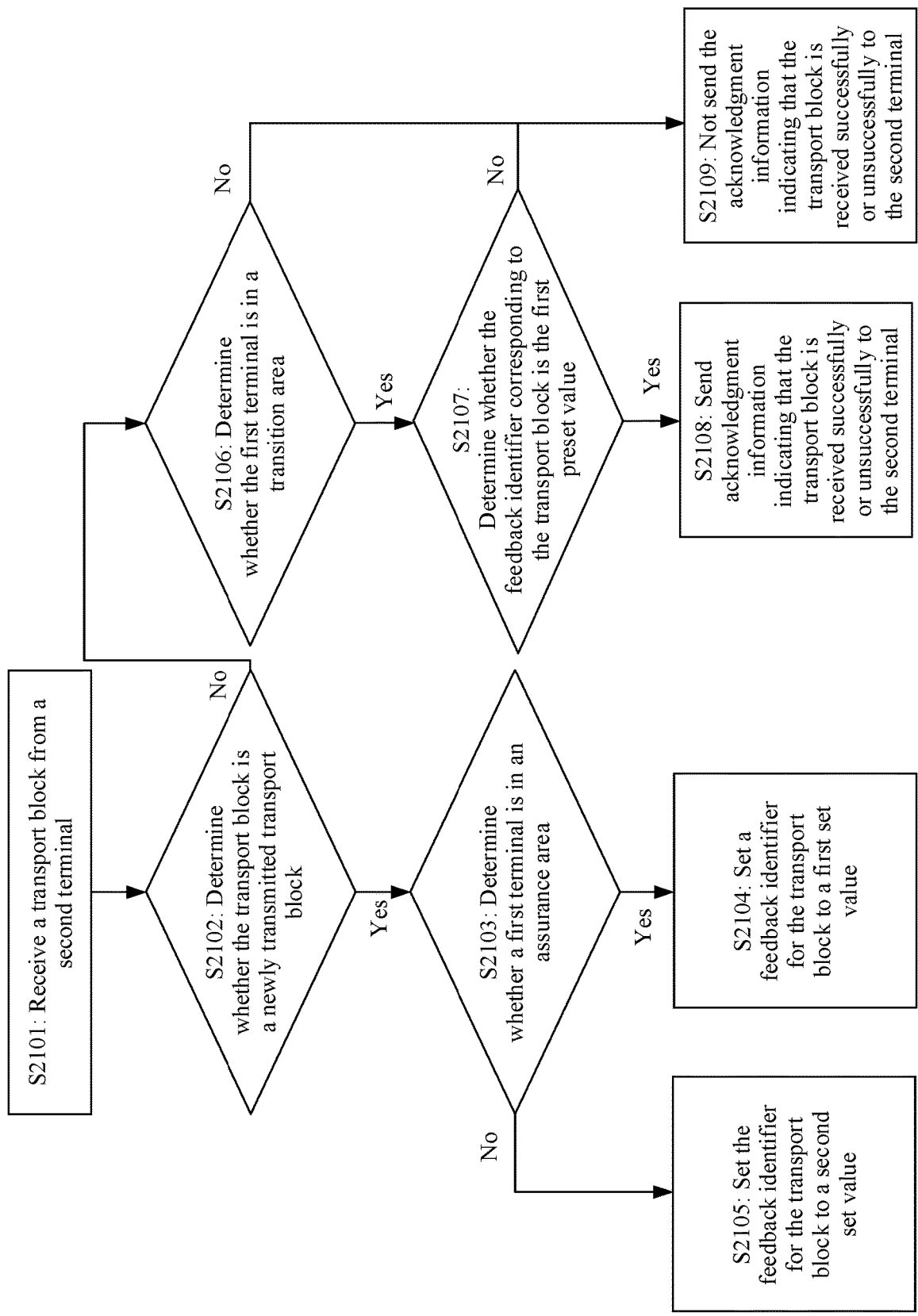

Refer to FIG. 21. An embodiment of a process in which the first terminal feeds back the HARQ information may include the following steps.

S2101: The first terminal receives the transport block from the second terminal.

For example, the first terminal parses the sidelink control channel PSCCH, to obtain the new transmission indication information, a HARQ process number, and control information. The new transmission indication information is used to indicate whether the transport block is a newly transmitted transport block, and the HARQ process number is used to indicate transport blocks that need to be combined. The first terminal parses the sidelink shared channel PSSCH based on the control information, to obtain the transport block.

S2102: The first terminal determines whether the transport block is a newly transmitted transport block; and if the transport block is a newly transmitted transport block, performs S2103; or if the transport block is not a newly transmitted transport block, performs S2106.

S2103: The first terminal determines whether the first terminal is in the assurance area; and if the first terminal is in the assurance area, performs S2104; or if the first terminal is not in the assurance area, performs S2105.

S2104: The first terminal sets a feedback identifier for the transport block to a first set value.

The first set value is used to indicate that the first terminal receives the transport block for the first time when the first terminal is in the assurance area.

It should be noted that, because the first terminal is in the assurance area, the first terminal sends the acknowledgment information indicating that the transport block is received successfully or unsuccessfully to the second terminal in the feedback manner of NACK only.

S2105: The first terminal sets a feedback identifier for the transport block to a second set value.

The second set value is used to indicate that the first terminal receives the transport block for the first time when the first terminal is not in the assurance area.

S2106: The first terminal determines whether the first terminal is in the transition area; and if the first terminal is in the transition area, performs S2107; or if the first terminal is not in the transition area, performs S2109.

S2107: The first terminal determines whether the feedback identifier corresponding to the transport block is a first preset value; and if the feedback identifier corresponding to the transport block is the first preset value, performs S2108; or if the feedback identifier corresponding to the transport block is not the first preset value, performs S2109.

S2108: The first terminal sends the acknowledgment information indicating that the transport block is received successfully or unsuccessfully to the second terminal.

S2109: The first terminal does not send the acknowledgment information indicating that the transport block is received successfully or unsuccessfully to the second terminal.

Figure 22:
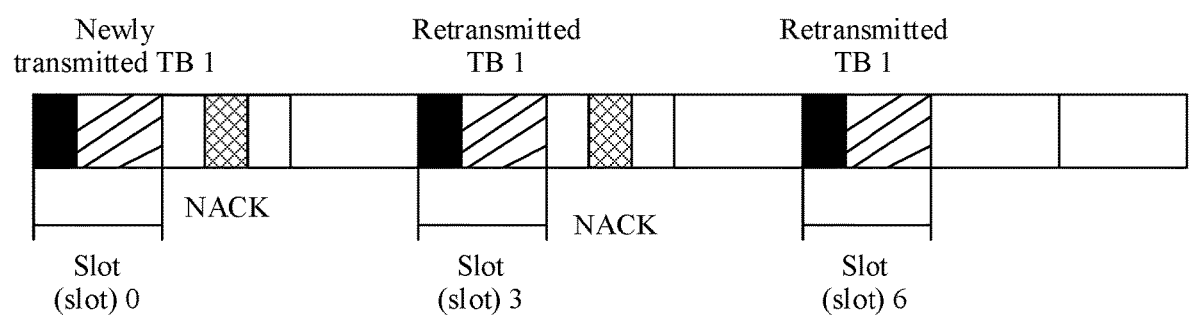
FIG. 22 is a schematic diagram of feedback effects of HARQ information according to an embodiment of this application.

Refer to FIG. 22. For example, FIG. 22 is a schematic diagram of feedback effects of the HARQ information. At the moment corresponding to the slot 0, the first terminal is in the assurance area, and unsuccessfully receives the transport block TB 1 for the first time. The first terminal sends the negative acknowledgment NACK information to the second terminal, and sets a feedback identifier of the transport block TB 1 to the first preset value.

At the moment corresponding to the slot 3, the first terminal is in the transition area, and unsuccessfully receives the retransmitted transport block TB 1 from the second terminal. Because the feedback identifier corresponding to the transport block TB 1 is the first preset value, the first terminal feeds back the NACK to the second terminal.

At the moment corresponding to the slot 6, the first terminal is still in the transition area, and successfully receives the retransmitted transport block TB 1 from the second terminal. Because the feedback manner is NACK only, the first terminal does not send any information to the second terminal.

In this way, if the first terminal unsuccessfully receives a newly transmitted transport block when the first terminal is in the assurance area, even if the first terminal is out of the assurance area and enters the transition area, the first terminal determines, based on the feedback identifier, whether to send the HARQ information to the second terminal, to ensure data transmission quality.

The following uses an example in which the preset condition is set based on the block error rate and the first terminal uses the feedback manner of NACK only. The communication method in this embodiment of this application may include: The first terminal determines a range of a vehicle location of the first terminal, and feeds back the HARQ information. For an embodiment of a specific implementation process in which the first terminal determines a range of a vehicle location of the first terminal, refer to S1701 to S1708, or S1901 to S1907. Details are not described herein again.

Figure 23:
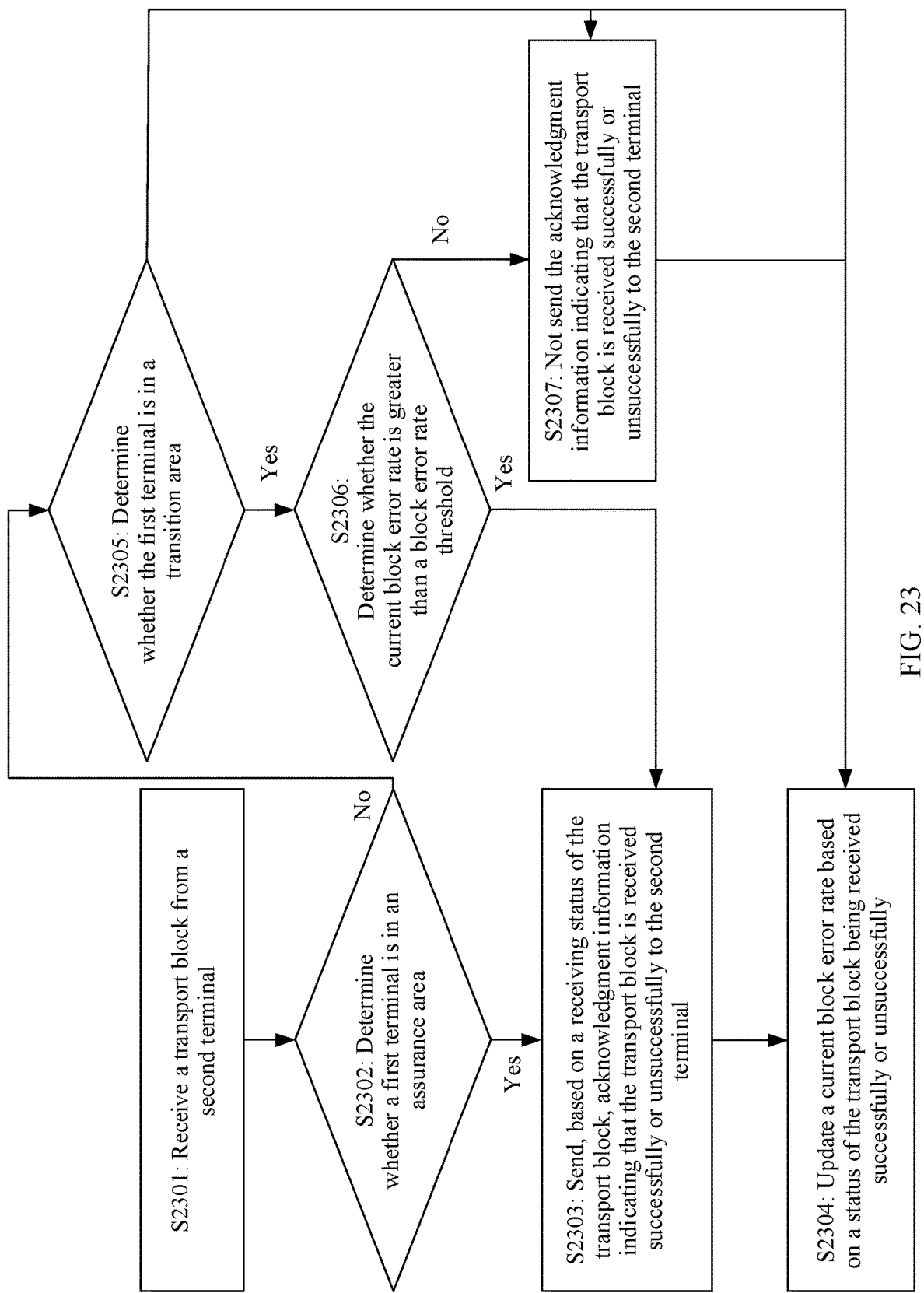
FIG. 23 is a flowchart of a communication method according to an embodiment of this application.

Refer to FIG. 23. An embodiment of a process in which the first terminal feeds back the HARQ information may include the following steps.

S2301: The first terminal receives the transport block from the second terminal.

S2302: The first terminal determines whether the first terminal is in the assurance area; and if the first terminal is in the assurance area, performs S2303; or if the first terminal is not in the assurance area, performs S2305.

S2303: The first terminal sends, based on a receiving status of the transport block, the acknowledgment information indicating that the transport block is received successfully or unsuccessfully to the second terminal.

S2304: The first terminal updates the current block error rate based on a status of transport block being received successfully or unsuccessfully.

For a specific implementation process of S2303, refer to related description in S8034. Details are not described herein again.

S2305: The first terminal determines whether the first terminal is in the transition area; and if the first terminal is in the transition area, performs S2306; or if the first terminal is not in the transition area, performs S2307 and S2304.

S2306: The first terminal determines whether the current block error rate is greater than the block error rate threshold; and if the current block error rate is greater than the block error rate threshold, performs S2303; or if the current block error rate is not greater than the block error rate threshold, performs S2307 and S2304.

S2307: The first terminal does not send the acknowledgment information indicating that the transport block is received successfully or unsuccessfully to the second terminal.

In this way, if the first terminal is in the transition area, the first terminal determines, based on the current block error rate, whether to send the HARQ information to the second terminal, to ensure data transmission quality. In a scenario in which all first terminals in the transition area need to feed back the HARQ information, the first terminal determines, based on the running state of the timer, whether to send the HARQ information to the second terminal, to avoid unnecessary data retransmission.

In a related technology, the location of the second terminal determined by the first terminal is not accurate enough. For example, the second terminal determines coordinate information (x,y) by using a global positioning system (GPS). The abscissa x indicates a ground measurement distance of longitude between the location of the second terminal and geographical coordinates (0, 0), and the vertical coordinate y indicates a ground measurement distance of latitude between the location of the second terminal and the geographic coordinates (0, 0). Then, geographical location information determined by the GPS is converted into an area code (e.g., zone identity) according to a preset area coding rule. Each area corresponds to one area code. For example, the geographical location coordinates (x,y) determined by the GPS and the area code meet the following relationship:

$$\begin{cases} x_1 = (x/L) \bmod N_x \\ y_1 = (y/W) \bmod N_y \\ \text{Zone id} = y_1 * N_x + x_1 \end{cases} \quad (8)$$

x indicates the ground measurement distance of the longitude between the location of the second terminal and the geographical coordinates (0, 0), L indicates a ground measurement length of each area, $N_x$ indicates a maximum quantity of areas in a length direction (x axis), y indicates the ground measurement distance of the latitude between the location of the second terminal and the geographic coordinates (0, 0), W indicates a ground measurement width of each area, $N_y$ indicates a maximum value of a quantity of areas in a width direction (y axis), Mod indicates a modulo operator, and Zone id indicates an area code of an area in which the second terminal is located.

Figure 24:
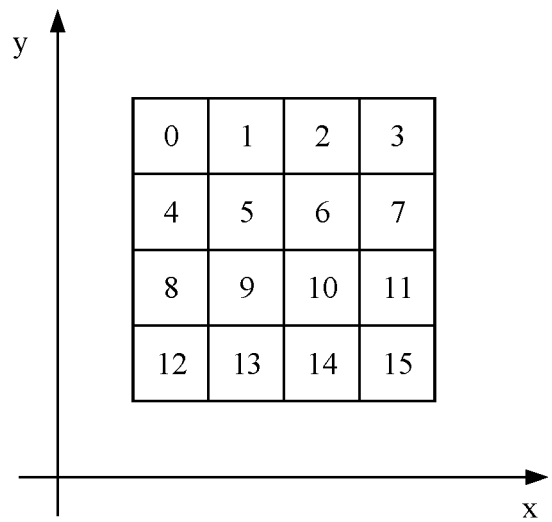
FIG. 24 is a schematic diagram of an area division scenario provided in a related technology.

An area corresponding to each area code is pre-divided. In a specific preset area range, an area is divided based on preset parameters (for example, the length L and the width W). Refer to FIG. 24. Each grid indicates an area range of an area, and a number (for example, any number from 0 to 15) in each grid is an area code of the area. However, the area code can indicate only a configuration area in which the second terminal is located, but cannot accurately indicate the location of the second terminal. If values of the preset parameters (for example, the length L and the width W) increase, a range of each area obtained through division increases. However, the preset area range is fixed. Correspondingly, a quantity of areas obtained through division decreases, and a quantity of bits of the area codes decreases. However, the area code is transmitted by using the SCI. Because the quantity of bits of the area codes decreases, resource overheads of the SCI decrease. However, because a range of an area corresponding to each area code increases, when the location of the second terminal is determined based on the area code, accuracy of the determined location lowers. On the contrary, if the values of the preset parameters (for example, the length L and the width W) decrease, the range of each area obtained through division decreases. However, the preset area range is fixed. Correspondingly, a quantity of areas obtained through division increases, and a quantity of bits of the area codes increases. However, the area code is transmitted by using the SCI. Because the quantity of bits of the area codes increases, resource overheads of the SCI increase, and a system capacity further decreases. In a specific area range, if a range of each area decreases, a quantity of areas increases. When quantities of bits of $N_x$ and $N_y$ are fixed, a range of the area code is also limited. Because a quantity of area codes is limited, one area code may correspond to two or more areas. In this case, the first terminal cannot determine the location of the second terminal based on only the area code.

Figure 25:
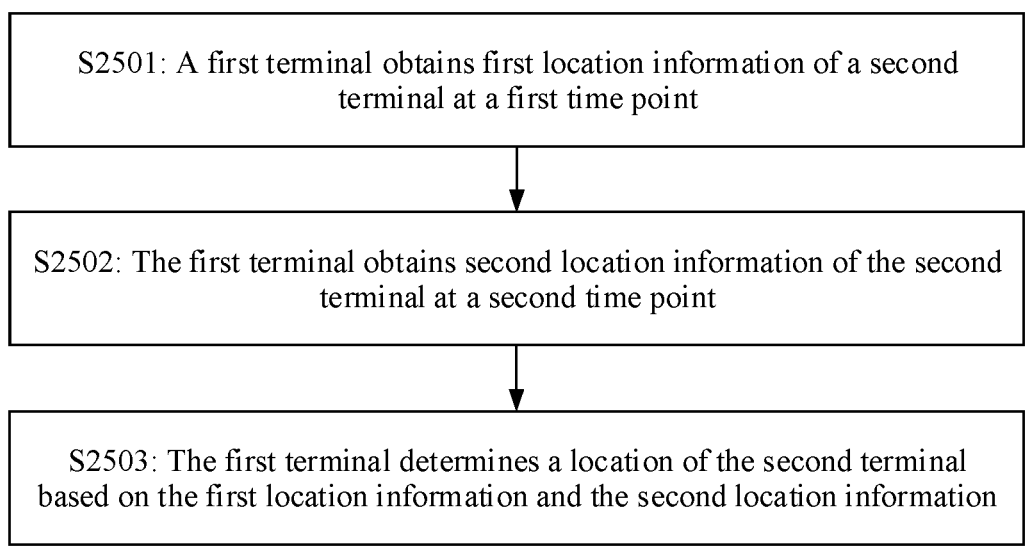
FIG. 25 is a flowchart of a communication method according to an embodiment of this application.

In view of this, an embodiment of this application further provides a communication method, to accurately determine the location of the second terminal. Refer to FIG. 25. The method includes the following steps.

S2501: A first terminal obtains first location information of a second terminal at a first time point.

The first location information may indicate a location of the second terminal. For example, the first location information may be GPS information, to indicate the location of the second terminal.

The first location information may alternatively indicate a first configuration area in which the second terminal is located. For example, the first location information may be area information, for example, an area code.

When the first location information (for example, the area information) indicates the first configuration area in which the second terminal is located, the first location information may be carried in SCI. The first terminal receives the SCI from the second terminal, to obtain the first location information.

The first location information may be further carried in a broadcast message. When receiving the first location information from the second terminal, the first terminal receives the broadcast message from an access network device, to obtain the first location information.

The first location information may alternatively be carried in RRC signaling. When receiving the first location information from the second terminal, the first terminal receives the RRC signaling from the access network device, to obtain the first location information. For example, the RRC signaling includes a plurality of information elements (IE), and the first location information is carried by using an IE or several IEs.

The first location information may alternatively be carried in MAC signaling. When receiving the first location information from the second terminal, the first terminal receives the MAC signaling from the access network device, to obtain the first location information. For example, the MAC signaling includes a plurality of control elements (CE), and the first location information is carried by using a CE or several CEs.

When the first location information (for example, the geographical location information) indicates the location of the second terminal, the first location information may be carried in the broadcast message, the RRC signaling, or the MAC signaling.

For example, the second terminal sends the first location information to the first terminal based on a preset time period, so that the first terminal obtains the required first location information. The preset time period may be a parameter configured by a network side, or may be a parameter set based on an actual movement speed of the second terminal. For example, when the actual movement speed of the second terminal is less than or equal to a first speed threshold, the preset time period is set to a first value; or when the actual movement speed of the second terminal is greater than a first speed threshold, the preset time period is set to a second value (the second value is less than the first value). For another example, a value of the preset time period is inversely proportional to a value of the actual movement speed of the second terminal. In other words, a larger value of the actual movement speed of the second terminal indicates a smaller value of the preset time period. Alternatively, after the first location information is sent last time, if a movement distance value of the second terminal is greater than a distance threshold, the second terminal sends the geographical location information to the first terminal. Alternatively, after the first location information is sent last time, if a movement distance value of the second terminal is greater than a distance threshold, the second terminal sends the first location information to the first terminal.

It should be noted that, in an execution process of S2501, a HARQ mechanism may be in a disabled state. To be specific, after obtaining the first location information of the second terminal, the first terminal does not need to feed back acknowledgment information to the second terminal. The second terminal only needs to directly send the first location information based on the preset time period, without considering whether the acknowledgment information fed back by the first terminal exists. Herein, the second terminal repeatedly sends the first location information, so that all first terminals that receive service data sent by the second terminal in a multicast manner can receive the first location information. Alternatively, the second terminal encodes, based on a preset encoding bit rate, service data that carries the first location information. An encoding bit rate of the preset encoding bit rate is low. Because the encoding bit rate is low, the first terminal can effectively receive the first location information even in a channel environment with a low signal-to-noise ratio.

In this way, the first terminal may obtain the first location information in a plurality of manners, to determine the location of the second terminal based on second location information, thereby ensuring accuracy of determining the location of the second terminal.

S2502: The first terminal obtains the second location information of the second terminal at a second time point.

The first time point is not later than the second time point. For example, the first terminal may first obtain the first location information, and then obtain the second location information. The first terminal may alternatively obtain the first location information and the second location information at the same time.

An interval at which the first terminal obtains the first location information may be greater than an interval at which the first terminal obtains the second location information.

The second location information indicates a second configuration area in which the second terminal is located. For example, the second location information may also be area information, for example, an area code.

Configuration parameters of the second configuration area are different from configuration parameters of the first configuration area. For example, a rectangular area is used as an example. Configuration parameters may be a length value L, a width value W, a maximum quantity $N_x$ of areas in a length direction (x axis), and a maximum quantity $N_y$ of areas in a width direction (y axis) that are of each area. For example, the configuration parameters of the first configuration area are respectively denoted as $L_1$, $W_1$, $N_{x1}$, and $N_{y1}$, where $N_{x1}=N_{y1}=8$. The configuration parameters of the second configuration area are respectively denoted as $L_2$, $W_2$, $N_{x2}$, and $N_{y2}$, where $N_x2=N_{y2}=4$, $L_1=L_2$, and $W_1=W_2$. In this way, an area range of the first configuration area is larger than an area range of the second configuration area. Compared with the second configuration area, the first configuration area can indicate a distance range that is farther from the second terminal.

A location of the second configuration area is determined based on the first location information and an area code of the second location information. For example, when the first location information is the area code and indicates the first configuration area in which the second terminal is located, the second configuration area may be an area corresponding to an area code closest to the first configuration area. When the first location information is the geographical location coordinates, the second configuration area may be an area corresponding to an area code closest to the geographical location coordinates.

The second location information may be carried in the SCI. The first terminal may receive the SCI from the second terminal, to obtain the second location information.

It should be noted that the SCI may carry different indication identifiers, so that the first terminal determines, based on the different indication identifiers, whether location information carried in the SCI is the first location information or the second location information.

In this way, the first terminal obtains the second location information by receiving the SCI, and then determines the location of the second terminal based on the first location information. Compared with manners of receiving the broadcast message, the RRC signaling, and the MAC signaling, a manner in which the first terminal obtains the second location information by receiving the SCI has strong timeliness and helps improve the accuracy of determining the location of the second terminal.

It should be noted that when the first location information indicates the first configuration area in which the first terminal is located, the first configuration area is greater than the second configuration area. For example, the rectangular area is used as an example, and the configuration parameters are a length and a width that are of each area. The length of the area is denoted as L, and the width of the area is denoted as W. A length of the first configuration area is denoted as $L_1$, and a width of the first configuration area is denoted as $W_1$. A length of the second configuration area is denoted as $L_2$, and a width of the area is denoted as $W_2$. The four configuration parameters meet a following relationship: $L_1>L_2$ or $W_1>W_2$. In a possible implementation, a size of the second configuration area may be determined based on a preset time period and the movement speed of the second terminal. Herein, the preset time period is a time period in which the first terminal obtains the first location information. For example, that values of $L_2$ and $W_2$ are the same, and $N_x=N_y=4$ is used as an example. At a moment, the preset time period is 1 s, and the movement speed of the second terminal is 360 km/h, in other words, a maximum travel distance of the second terminal per second is S=100 m. In this case, $L_2$ and $W_2$ may be set to 50 m.

In this way, the first configuration area is larger than the second configuration area. The two configuration areas have different area ranges. Both the first configuration area and the second configuration area are used to determine the location of the second terminal. The first terminal may first determine a large area range based on the first configuration area, and then accurately determine the location of the second terminal based on the second configuration area. This helps improve positioning precision and avoid a problem that the location is inaccurate.

S2503: The first terminal determines the location of the second terminal based on the first location information and the second location information.

There are a plurality of implementations of S2503, including but not limited to the following three possible implementations.

Figure 26:
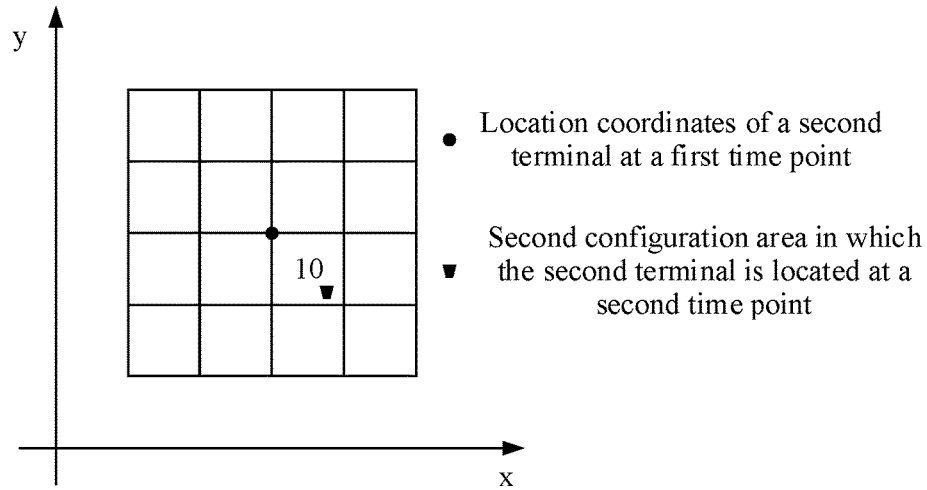
FIG. 26 to FIG. 28 are schematic diagrams of a communication scenario according to an embodiment of this application.

In a first possible implementation, the first location information is coordinate information $(x_{TX}, y_{TX})$, where $x_{TX}$ indicates a ground measurement distance of longitude between the location of the second terminal at the first time point and geographical coordinates (0, 0), and $y_{TX}$ indicates a ground measurement distance of latitude between the location of the second terminal at the first time point and the geographical coordinates (0, 0), which is shown as a location of a circular icon in FIG. 26. The second location information is the area code. The area code corresponds to more than one area. In this case, the first terminal selects an area with a minimum distance from the coordinate information ($x_{TX}, y_{TX}$), for example, an area in which a trapezoidal icon shown in FIG. 26 is located, namely, an area whose area code is 10. The first terminal determines the location of the second terminal based on the area (the area with the minimum distance from the coordinate information ($x_{TX}, y_{TX}$)). If there is more than one area with a minimum distance from the coordinate information ($x_{TX}, y_{TX}$), a distance value between each area (the area with the minimum distance from the coordinate information ($x_{TX}, y_{TX}$)) and the first terminal is determined, and the location of the second terminal is determined based on an area with the minimum distance value.

In a second possible implementation, when both the first location information and the second location information are the area codes, the configuration parameters of the first location information are $L_1=200$, $W_1=200$, and $N_x=N_y=4$. The configuration parameters of the second location information are $L_2=200$, $W_2=200$ and $N_x=N_y=4$. The first terminal determines coordinate information ($x_{RX1}, y_{RX1}$) based on GPS at the first time point, where $x_{RX1}$ indicates a ground measurement distance of longitude between a location of the first terminal at the first time point and the geographical coordinates (0, 0), and $y_{RX1}$ indicates a ground measurement distance of latitude between the location of the first terminal at the first time point and the geographical coordinates (0, 0). The area code of the first location information corresponds to more than one area. In this case, the first terminal selects an area with a minimum distance from the coordinate information ($x_{RX1}, y_{RX1}$) from a plurality of areas corresponding to the area code of the first location information as a first configuration area of the second terminal at the first time point. The area code of the second location information corresponds to more than one area. In this case, the first terminal selects an area with a minimum distance from the first configuration area (the area is the first configuration area of the second terminal at the first time point) from a plurality of areas corresponding to the area code of the second location information as a second configuration area of the second terminal at the second time point. The second configuration area of the second terminal at the second time point may be an area closest to a center point of the first configuration area. The location of the second terminal is determined based on the second configuration area of the second terminal at the second time point.

Figure 27:
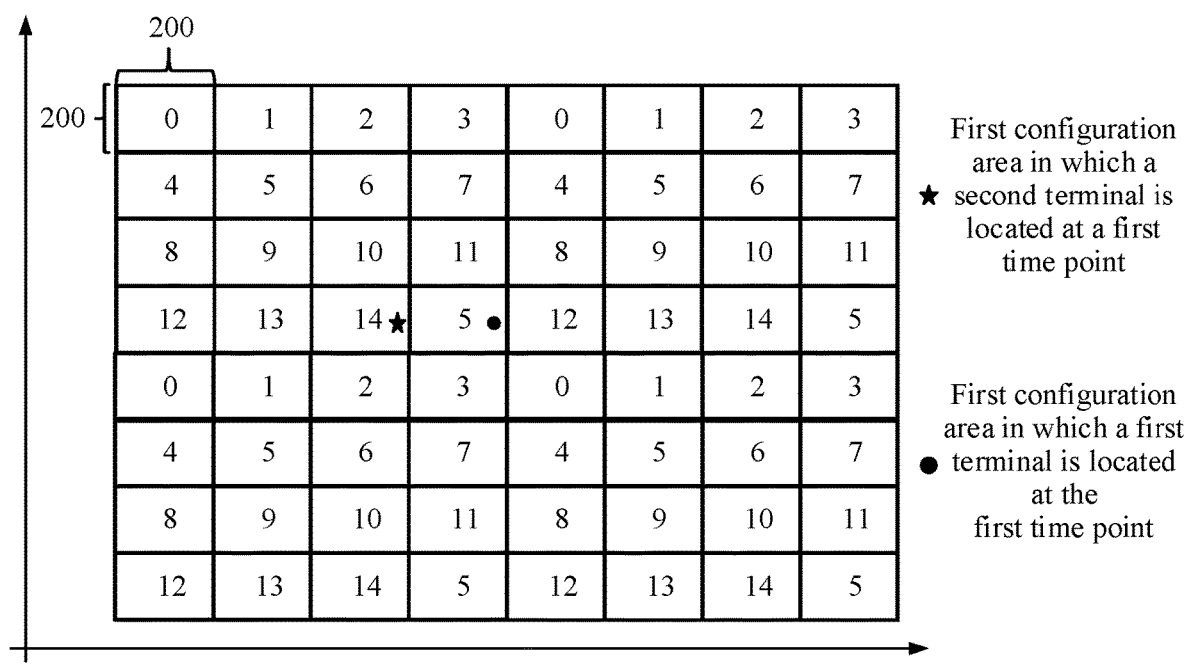

In a third possible implementation, when both the first location information and the second location information are the area codes, the configuration parameters of the first location information are $L_1=200$, $W_1=200$, and $N_x=N_y=4$. The configuration parameters of the second location information are $L_2=200$, $W_2=200$, and $N_x=N_y=4$. The first terminal determines the coordinate information ($x_{RX1}, y_{RX1}$) based on the GPS at the first time point, where $x_{RX1}$ indicates the ground measurement distance of the longitude between the location of the first terminal at the first time point and the geographical coordinates (0, 0), and $y_{RX1}$ indicates the ground measurement distance of the latitude between the location of the first terminal at the first time point and the geographical coordinates (0, 0). The first terminal determines the coordinate information ($x_{RX1}, y_{RX1}$) based on the GPS, and determines the first configuration area of the first terminal at the first time point. Refer to FIG. 27. The first configuration area of the first terminal at the first time point may be an area in which a circular icon is located, namely, an area whose area code is 5.

The area code of the first location information corresponds to more than one area. In this case, the first terminal selects the area with the minimum distance from the first configuration area of the first terminal at the first time point from the plurality of areas corresponding to the area code of the first location information as the first configuration area of the second terminal at the first time point. Refer to FIG. 27. The first configuration area of the second terminal at the first time point may be an area in which a star icon is located, namely, an area whose area code is 14.

Figure 28:
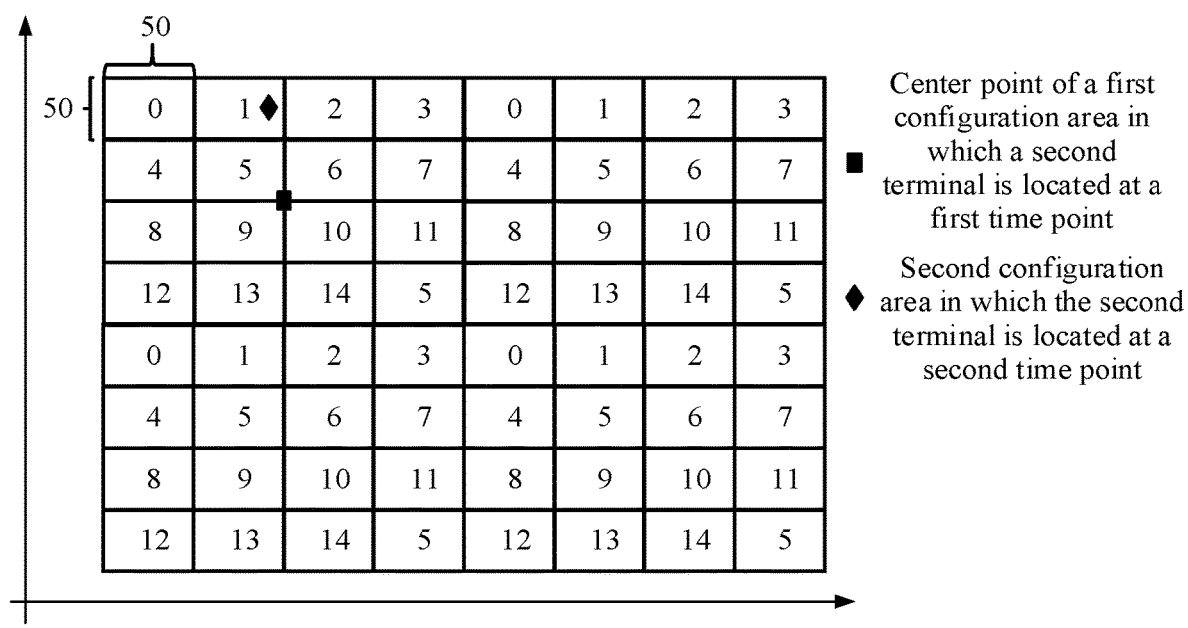

The area code of the second location information corresponds to more than one area. In this case, the first terminal selects the area with the minimum distance from the first configuration area (the area is the first configuration area of the second terminal at the first time point) from the plurality of areas corresponding to the area code of the second location information as the second configuration area of the second terminal at the second time point. The second configuration area of the second terminal at the second time point may be the area closest to the center point of the first configuration area. Refer to FIG. 28. A square icon is the center point of the first configuration area, namely, a center point of a first configuration area whose area code is 14. The second configuration area of the second terminal at the second time point may be an area in which a diamond icon is located.

Figure 29:
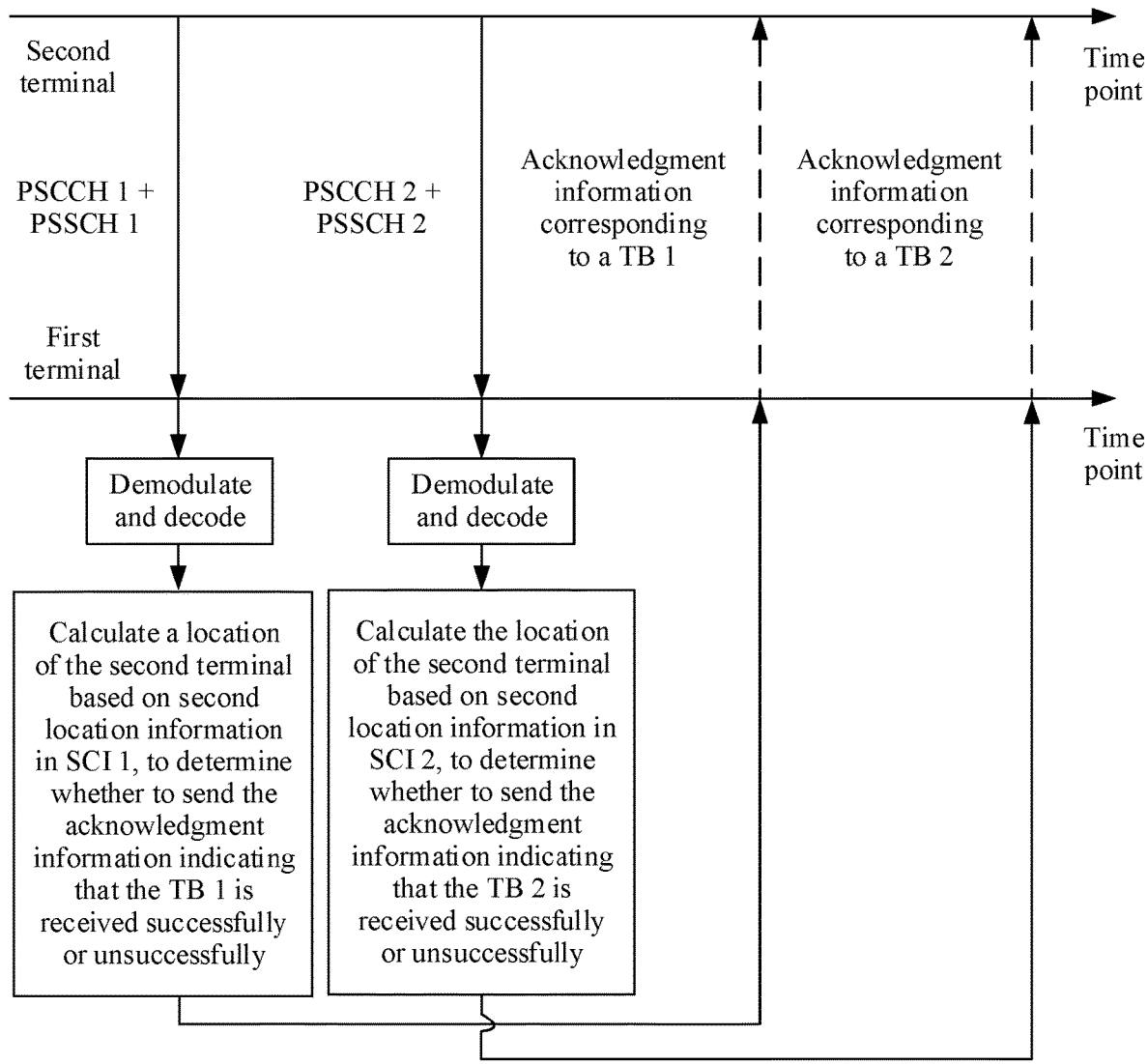
FIG. 29 and FIG. 30 are schematic diagrams of a scenario of feeding back HARQ information according to an embodiment of this application.

It should be noted that, in S2503, the second location information used to determine the location of the second terminal may be information carried in SCI corresponding to a physical sidelink shared channel PSSCH for transmitting the service data. The SCI further includes information indicating time-frequency resources of the physical sidelink shared channel PSSCH, and the PSSCH is used to transmit the service data. One PSSCH corresponds to one piece of SCI. When determining the location of the second terminal, the first terminal may find the SCI corresponding to the PSSCH for transmitting the service data, and determine the location of the second terminal based on the second location information in the SCI. For example, refer to FIG. 29. The service data is transmitted in a form of a transport block, and the second terminal transmits SCI 1 to the first terminal through a PSCCH 1, where the SCI 1 includes the second location information and information indicating time-frequency resources of a PSSCH 1. The second terminal transmits a transport block TB 1 to the first terminal through the PSSCH 1. At a moment t1, the first terminal receives the PSCCH 1 and data on the PSSCH 1, demodulates and decodes the PSSCH 1 and the data on the PSCCH 1, and calculates the location of the second terminal based on the second location information in the SCI 1. In a distance-based quality-of-service requirement service scenario, the first terminal determines, based on the location of the second terminal, whether to send acknowledgment information indicating that the transport block TB 1 is received successfully or unsuccessfully. If the first terminal determines to send the acknowledgment information indicating that the transport block TB 1 is received successfully or unsuccessfully, the first terminal sends the acknowledgment information of the TB 1 to the second terminal. Alternatively, if the first terminal determines not to send the acknowledgment information indicating that the transport block TB 1 is received successfully or unsuccessfully, the first terminal does not need to send the acknowledgment information to the second terminal (not shown in FIG. 29). Similarly, the second terminal transmits SCI 2 to the first terminal through a PSCCH 2, where the SCI 2 includes the second location information and information indicating time-frequency resources of a PSSCH 2. The second terminal transmits a transport block TB 2 to the first terminal through the PSSCH 2. At a moment t2, the first terminal receives the PSCCH 2 and data on the PSSCH 2, demodulates and decodes the PSSCH 2 and the data on the PSCCH 2, and calculates the location of the second terminal based on the second location information in the SCI 2, to determine whether to send acknowledgment information indicating that the transport block TB 2 is received successfully or unsuccessfully. If the first terminal determines to send the acknowledgment information indicating that the transport block TB 2 is received successfully or unsuccessfully, the first terminal sends the acknowledgment information of the TB 2 to the second terminal. Alternatively, if the first terminal determines not to send the acknowledgment information indicating that the transport block TB 2 is received successfully or unsuccessfully, the first terminal does not need to send the acknowledgment information to the second terminal (not shown in FIG. 29).

Figure 30:
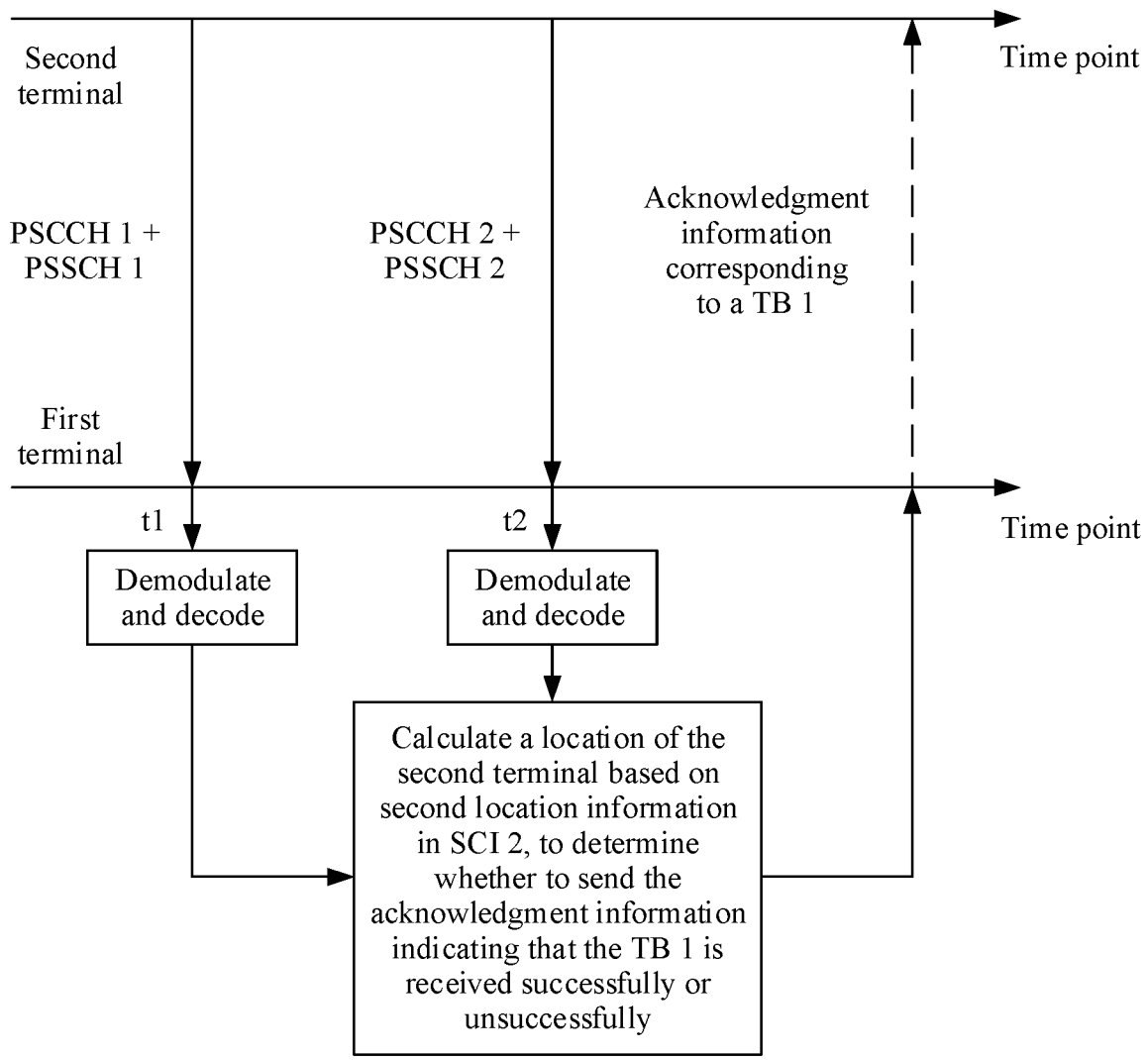

The second location information used to determine the location of the second terminal may alternatively be information carried in recently received SCI. The first terminal may find the recently received SCI, and determine the location of the second terminal based on the second location information in the recently received SCI. For example, refer to FIG. 30. The service data is transmitted in the form of the transport block, and the second terminal transmits the SCI 1 to the first terminal through the PSCCH 1, where the SCI 1 includes the second location information and the information indicating the time-frequency resources of the PSSCH 1. The second terminal transmits the transport block TB 1 to the first terminal through the PSSCH 1. At the moment t1, the first terminal receives the PSCCH 1 and the data on the PSSCH 1, and demodulates and decodes the PSCCH 1 and the data on the PSCCH 1. At the moment t2, the first terminal receives the PSCCH 2 and the data on the PSSCH 2, and demodulates and decodes the PSCCH 2 and the data on the PSCCH 2. Because a moment at which the first terminal receives the SCI 2 is later than a moment at which the first terminal receives the SCI 1, the first terminal determines the location of the second terminal based on the second location information in the SCI 2, and further determines whether to send the acknowledgment information indicating that the TB 1 is received successfully or unsuccessfully. If the first terminal determines to send the acknowledgment information indicating that the TB 1 is received successfully or unsuccessfully, the first terminal sends the acknowledgment information of the TB 1 to the second terminal. Alternatively, if the first terminal determines not to send the acknowledgment information indicating that the TB 1 is received successfully or unsuccessfully, the first terminal does not need to send the acknowledgment information to the second terminal (not shown in FIG. 30). In addition, for the TB 2, if the first terminal does not receive new SCI within a preset time period, the first terminal also calculates the location of the second terminal based on the second location information in the SCI 2, and further determines whether to send the acknowledgment information indicating that the TB 2 is received successfully or unsuccessfully. If the first terminal receives the new SCI within the preset time period, the first terminal determines the location of the second terminal based on information that is in the new SCI and that indicates the area in which the second terminal is located, to determine whether to send the acknowledgment information indicating that the TB 2 is received successfully or unsuccessfully (not shown in FIG. 30).

According to the communication method in this embodiment of this application, the first terminal obtains the first location information of the second terminal at the first time point. The first terminal obtains the second location information of the second terminal at the second time point. The first terminal determines the location of the second terminal based on the first location information and the second location information. The first location information indicates the location of the second terminal or the first configuration area in which the second terminal is located. The second location information indicates the second configuration area in which the second terminal is located, and the configuration parameters of the first configuration area are different from the configuration parameters of the second configuration area. The first time point is not later than the second time point. In the conventional technology, when the location of the second terminal is determined by using an area code, the problem that the location is inaccurate exists only based on the one area code. According to the communication method in this embodiment of this application, the first location information can indicate the location of the second terminal or the first configuration area in which the second terminal is located, and the second location information indicates the second configuration area in which the second terminal is located. When determining the location of the second terminal, the first terminal needs to determine the location of the second terminal based on the first location information and the second location information, that is, based on the location of the second terminal (indicated by the first location information) and the second configuration area; or determine the location of the second terminal based on the first configuration area and the second configuration area whose configuration parameters are different from each other. This avoids the problem that the location is inaccurate or a problem that the second terminal cannot be located only based on the one area code.

Figure 31:
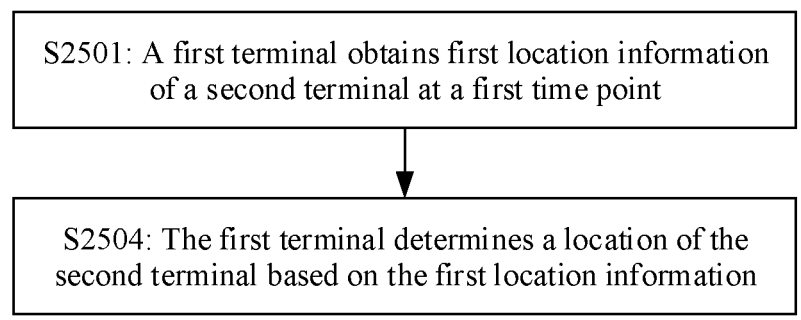
FIG. 31 is a flowchart of a communication method according to an embodiment of this application.

In addition, an embodiment of this application further provides a communication method. To be specific, when the first location information indicates the location of the second terminal, the first terminal determines the location of the second terminal based on the first location information. Refer to FIG. 31. The first terminal performs S2501 and S2504.

S2501: The first terminal obtains the first location information of the second terminal at the first time point.

The first location information indicates the location of the second terminal.

S2504: The first terminal determines the location of the second terminal based on the first location information.

For example, the first location information can indicate the coordinate information of the second terminal $(x_{TX}, y_{TX})$, where $x_{TX}$ indicates the ground measurement distance of longitude between the location of the second terminal at the first time point and the geographical coordinates (0, 0), and $y_{TX}$ indicates the ground measurement distance of latitude between the location of the second terminal at the first time point and the geographical coordinates (0, 0). The first terminal directly uses the coordinate information $(x_{TX}, y_{TX})$ as the location of the second terminal. Alternatively, the first terminal performs adjustment based on the coordinate information $(x_{TX}, y_{TX})$, for example, the first terminal offsets a specific distance value, to obtain the location of the second terminal.

In this way, the first terminal may obtain the location of the second terminal based on the first location information. Compared with the conventional technology in which the area code is used to indicate the area in which the second terminal is located, according to the communication method in this embodiment of this application, the first location information is used to directly indicate the location of the second terminal. The first terminal may directly obtain the location of the second terminal based on the first location information, thereby simplifying a location determining operation process. The first terminal obtains the first location information by using the access network device, to determine the location of the second terminal, so that the second terminal does not need to directly send the first location information to the first terminal, thereby saving sidelink time-frequency resources.

It should be noted that, according to the communication method in this embodiment of this application, when the first location information indicates the location of the second terminal, it is reasonable that the first terminal determines the location of the second terminal only based on the first location information. A specific analysis process is as follows: A maximum movement speed of the second terminal is 360 km/h, and the maximum traveling distance of the second terminal per second is 100 m. An interval for transmitting the first location information is 1 s. In this way, when the first terminal determines the location of the second terminal, a maximum error is 100 m, and an average error is 50 m. A required communication distance is 1000 m, which falls within an allowed error range.

In this case, the first terminal may determine the location of the second terminal only based on the first location information, or the first terminal determines the location of the second terminal based on the first location information and the second location information, to further determine a distance value between the first terminal and the second terminal. In this way, when receiving the service data from the second terminal, the first terminal determines whether to feed back acknowledgment information indicating that the service data is received successfully or unsuccessfully. For example, when the distance value is less than the required communication distance (in other words, the first terminal is in an assurance area, and the distance value is less than a first preset distance value), the first terminal feeds back the acknowledgment information indicating that the service data is received successfully or unsuccessfully. Otherwise, the first terminal does not feed back any acknowledgment information. For another example, when the distance value is less than the required communication distance (in other words, the first terminal is in the assurance area, and the distance value is less than the first preset distance value), the first terminal performs S802. When the distance value falls within a preset distance range (in other words, the first terminal is in a transition area), the first terminal performs S803. When the distance value is greater than a second preset distance value, the first terminal does not feed back any acknowledgment information.

The following describes the communication method provided in this embodiment of this application by using the distance-based quality-of-service requirement service scenario as an example. In an embodiment of a possible design, the first terminal determines the location of the second terminal only based on the first location information. In this case, the first location information may be the geographical location information and indicates the location of the second terminal. Before the first terminal determines that the first terminal is in the assurance area (in other words, the distance value between the first terminal and the second terminal is less than or equal to the first preset distance value) or the transition area (in other words, the distance value between the first terminal and the second terminal falls within the preset distance range), the first terminal may perform S801, S2501, and S2504. In this case, the first terminal may determine the location of the second terminal only based on the first location information, and further determine the distance value between the first terminal and the second terminal, to determine a location of the first terminal. If the first terminal is in the assurance area, the first terminal performs S802. If the first terminal is in the transition area, the first terminal performs S803.

It should be noted that, when determining whether the first terminal needs to send the acknowledgment information of the service data to the second terminal based on the first location information, the first terminal needs to refer to first location information closest to a time point at which the service data is received.

In still another possible embodiment of a design, the first terminal determines the location of the second terminal based on the first location information and the second location information. Before the first terminal determines that the first terminal is in the assurance area (in other words, the distance value between the first terminal and the second terminal is less than or equal to the first preset distance value) or the transition area (in other words, the distance value between the first terminal and the second terminal falls within the preset distance range), the first terminal may perform S801, S2501, S2502, and S2503. In this case, the first terminal may determine the location of the second terminal based on the first location information and the second location information, and further determine the distance value between the first terminal and the second terminal, to determine the location of the first terminal. If the first terminal is in the assurance area, the first terminal performs S802. If the first terminal is in the transition area, the first terminal performs S803.

It should be noted that after the first terminal determines the second configuration area, the first terminal may determine the distance value based on the second configuration area in the following manners.

Figure 32:
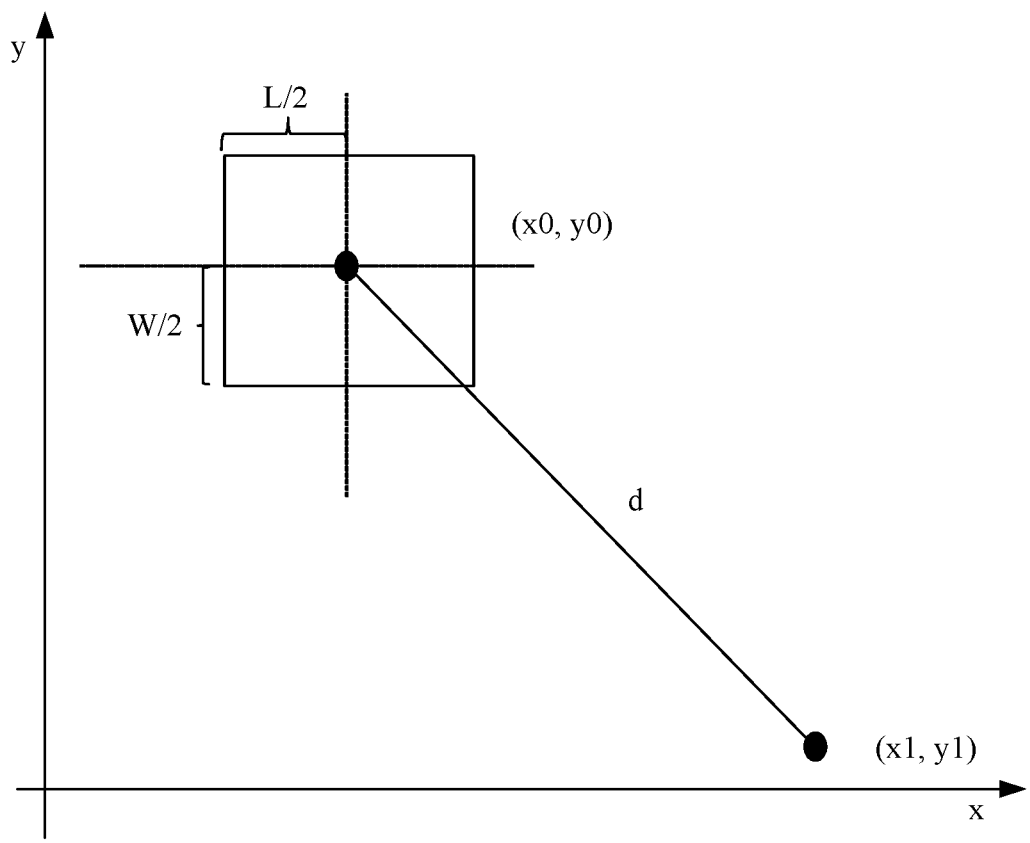
FIG. 32 is a schematic diagram of a scenario of calculating a distance according to an embodiment of this application.

Manner 1: A center point of the second configuration area of the second terminal at the second time point is considered as the location of the second terminal at the second time point, and calculation is performed based on the center point. Refer to FIG. 32. A solid line box indicates the second configuration area, and a focal point of two dashed solid lines indicates the center point of the second configuration area, which is denoted as $(x_0, y_0)$. The location point of the first terminal is denoted as $(x_1, y_1)$, where the location point $(x_1, y_1)$ may be the location coordinates determined by the first terminal based on GPS, or may be the center point of the second configuration area of the first terminal at the second time point.

A solid line between the two terminals indicates an initial distance value between the two terminals, and is denoted as e. e meets the following formula:

$$e = \sqrt{(x_1-x_0)^2 + (y_{=1}-y_{=0})^2} \qquad (9).$$

Manner 2: The center point of the second configuration area of the second terminal at the second time point is considered as the location of the second terminal at the second time point. In this case, a maximum error value is $\sqrt{L^2+W^2}/2$, and the first terminal calculates the initial distance value based on the center point and the maximum error value. FIG. 21 is still used as an example. e meets the following formula:

$$e = \sqrt{(x_1-x_0)^2 + (y_1-y_0)^2} - \sqrt{L^2+W^2}/2 \qquad (10).$$

After obtaining the initial distance value e by using formula (9) or formula (10), the first terminal obtains the distance value between the first terminal and the second terminal according to formula (2) or formula (3). Alternatively, the first terminal may directly use e in formula (9) or formula (10) as the distance value between the first terminal and the second terminal.

The foregoing describes the solutions provided in the embodiments of this application, mainly from a perspective of interaction between different network elements. It may be understood that, to implement the foregoing functions, the first terminal and the second terminal include corresponding hardware structures and/or software modules for executing the functions. With reference to the units and algorithm steps described in the embodiments disclosed in this application, the embodiments of this application can be implemented in a form of hardware or hardware and computer software. Whether a function is executed by hardware or hardware driven by computer software depends on particular applications and design constraints of the technical solutions. A person skilled in the art may use different methods to implement the described functions for each particular application, but it should not be considered that the implementation falls beyond the scope of the technical solutions in the embodiments of this application.

In the embodiments of this application, the communication apparatus may be divided into functional units based on the foregoing method example. For example, each functional unit may be obtained through division based on each corresponding function, or two or more functions may be integrated into one processing unit. The integrated unit may be implemented in a form of hardware, or may be implemented in a form of a software functional unit. It should be noted that division into the units in the embodiments of this application is an example, is merely logical function division and may be other division during actual implementation.

Figure 33:
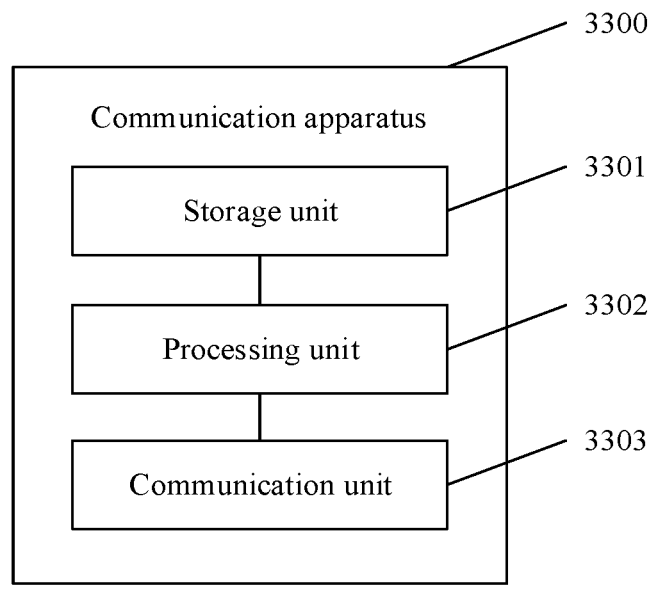
FIG. 33 and FIG. 34 are schematic diagrams of structures of communication apparatuses according to an embodiment of this application.

FIG. 33 is a schematic block diagram of a communication apparatus according to an embodiment of this application. The communication apparatus 3300 may exist in a form of software; or may be a device, or a component (for example, a chip system) in a device. The communication apparatus 3300 includes a storage unit 3301, a processing unit 3302, and a communication unit 3303.

The communication unit 3303 may be further divided into a sending unit (not shown in FIG. 33) and a receiving unit (not shown in FIG. 33). The sending unit is configured to support the communication apparatus 3300 to send information to another network element. The receiving unit is configured to support the communication apparatus 3300 to receive information from the another network element.

The storage unit 3301 is configured to store program code and data of the communication apparatus 3300, where the data may include but is not limited to original data, intermediate data, or the like.

When the communication apparatus 3300 is used as a first terminal, the communication unit 3303 is configured to receive service data from a second terminal. The processing unit 3302 is configured to determine that a distance value between the communication apparatus 3300 and the second terminal falls within a preset distance range and meets a preset condition. The communication unit 3303 is further configured to: when the processing unit 3302 determines that the distance value between the communication apparatus 3300 and the second terminal falls within the preset distance range and meets the preset condition, send acknowledgment information indicating that the service data is received successfully or unsuccessfully to the second terminal. The preset distance range is determined based on a first preset distance value and a second preset distance value, and the second preset distance value is greater than the first preset distance value.

In an embodiment of a possible design, the preset condition includes that a time length between a first time point and a second time point is less than a preset time parameter, where the first time point is a time point at which the distance value is recently determined to be less than or equal to the first preset distance value, and the second time point is a time point at which the distance value is recently determined to fall within the preset distance range.

That the processing unit 3302 is configured to determine that the preset condition is met includes: The processing unit 3302 is configured to determine that the time length between the first time point and the second time point meets the preset condition.

In an embodiment of a possible design, the preset time parameter is used to configure a timer, timing duration of the timer is T, and the first time point is a start time point of the timer.

That processing unit 3302 is configured to determine that the time length between the first time point and the second time point meets the preset condition includes: The processing unit 3302 is configured to determine that the timer is in a running state.

In an embodiment of a possible design, the service data is service data repeatedly transmitted by the second terminal, and is transmitted in a form of a transport block; and the preset condition includes that when the communication apparatus 3300 receives the transport block for the first time, the distance value is less than or equal to the first preset distance value.

That the processing unit 3302 is configured to determine that the preset condition is met includes: The processing unit 3302 is configured to determine that the retransmitted transport block meets the preset condition.

In an embodiment of a possible design, the service data is transmitted in a form of a transport block, and the preset condition includes that a block error rate is greater than a block error rate threshold.

That the processing unit 3302 is configured to determine that the preset condition is met includes: The processing unit 3302 is configured to determine that a current block error rate meets the preset condition.

In an embodiment of a possible design, the processing unit 3302 is further configured to: if the distance value is less than or equal to the second preset distance value, update the current block error rate based on a status of the transport block being received successfully or unsuccessfully.

In an embodiment of a possible design, the processing unit 3302 is further configured to correct an initial distance value between the communication apparatus 3300 and the second terminal based on a relative movement speed between the communication apparatus 3300 and the second terminal and a preset correction time period, to obtain the distance value between the communication apparatus 3300 and the second terminal. Alternatively, the processing unit 3302 is further configured to correct an initial distance value between the communication apparatus 3300 and the second terminal based on a relative movement speed between the communication apparatus 3300 and the second terminal and a preset correspondence, to obtain the distance value between the communication apparatus 3300 and the second terminal, where the initial distance value is a distance value indicated by reference signal received power, and the preset correspondence is a correspondence between a relative movement speed and a reference signal received power adjustment amount.

When the communication apparatus 3300 is used as the first terminal, the communication unit 3303 is configured to obtain first location information of the second terminal at the first time point. The communication unit 3303 is further configured to obtain second location information of the second terminal at the second time point. The processing unit 3302 is configured to determine a location of the second terminal based on the first location information and the second location information. The first location information indicates the location of the second terminal or a first configuration area in which the second terminal is located. The second location information indicates a second configuration area in which the second terminal is located, and configuration parameters of the first configuration area are different from configuration parameters of the second configuration area. The first time point is not later than the second time point.

In an embodiment of a possible design, the first location information is carried in a broadcast message, radio resource control RRC signaling, medium access control MAC signaling, or sidelink control information SCI.

In an embodiment of a possible design, the second location information is carried in SCI.

In an embodiment of a possible design, when the first location information indicates the first configuration area in which the second terminal is located, the first configuration area is greater than the second configuration area.

The processing unit 3302 may be a processor or a controller, for example, may be a CPU, a general-purpose processor, a DSP, an ASIC, an FPGA or another programmable logic device, a transistor logic device, a hardware component, or any combination thereof. The processing unit 3302 may implement or execute various example logical blocks, modules, and circuits described with reference to content disclosed in this application. Alternatively, the processor may be a combination of processors implementing a computing function, for example, a combination of one or more microprocessors, or a combination of a DSP and a microprocessor.

The communication unit 3303 may be a communication interface, a transceiver, a transceiver circuit, or the like. The communication interface is a general name. In a specific implementation, the communication interface may include a plurality of interfaces, for example, an interface between terminals and/or another interface.

The storage unit 3301 may be a memory.

Figure 34:
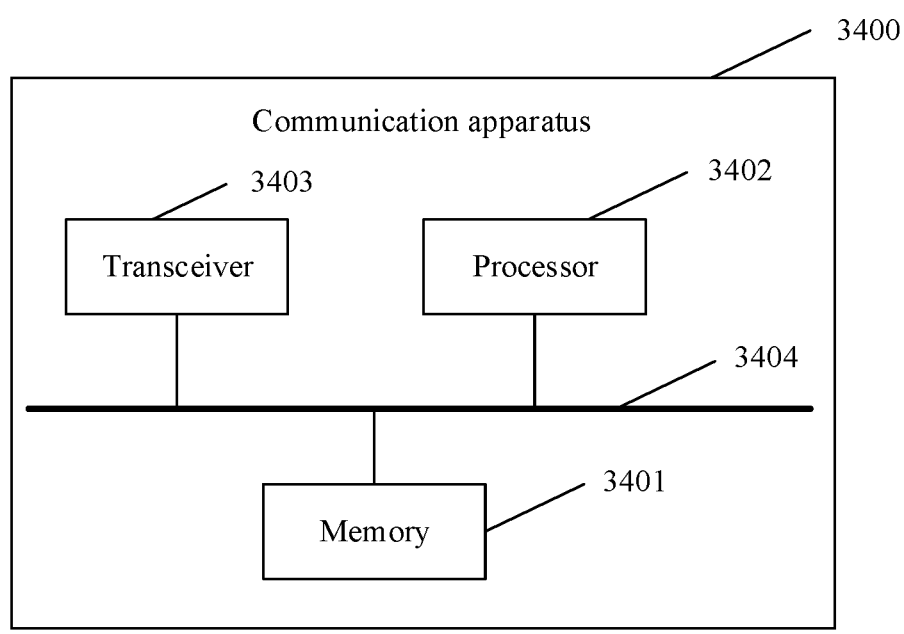

When the processing unit 3302 is the processor, the communication unit 3303 is the communication interface, and the storage unit 3301 is the memory, a communication apparatus 3400 in this embodiment of this application may be shown in FIG. 34.

Refer to FIG. 34. The communication apparatus 3400 includes a processor 3402, a transceiver 3403, and a memory 3401.

The transceiver 3403 may be an independently disposed transmitter, and the transmitter may be configured to send information to another device. Alternatively, the transceiver may be an independently disposed receiver, and is configured to receive information from another device. Alternatively, the transceiver may be a component integrating functions of sending and receiving information. A specific implementation of the transceiver is not limited in this embodiment of this application.

Optionally, the communication apparatus 3400 may further include a bus 3404. The transceiver 3403, the processor 3402, and the memory 3401 may be connected to each other through the bus 3404. The bus 3404 may be a peripheral component interconnect (PCI) bus, an extended industry standard architecture (EISA) bus, or the like. The bus 3404 may be classified into an address bus, a data bus, a control bus, and the like. For ease of representation, only one thick line is used to represent the bus in FIG. 34, but this does not mean that there is only one bus or only one type of bus.

A person of ordinary skill in the art may understand that all or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, all or some of the procedures or functions according to the embodiments of this application are generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave) manner. The computer-readable storage medium may be any usable medium accessible by a computer, or a data storage device, for example, a server or a data center, integrating one or more usable media. The usable medium may be a magnetic medium (for example, a floppy disk, a hard disk, or a magnetic tape), an optical medium (for example, a digital video disc (DVD)), a semiconductor medium (for example, a solid-state drive (SSD)), or the like.

In the several embodiments provided in this application, it should be understood that the disclosed system, apparatus, and method may be implemented in other manners. For example, the described apparatus embodiment is merely an example. For example, division into the units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic or other forms.

The units described as separate parts may or may not be physically separate, and parts displayed as units may or may not be physical units, may be located at one position, or may be distributed on a plurality of network devices (for example, terminals). Some or all of the units may be selected based on an actual requirement to achieve objectives of the solutions of the embodiments.

In addition, functional units in the embodiments of this application may be integrated into one processing unit, or each of the functional units may exist independently, or two or more units are integrated into one unit. The integrated unit may be implemented in a form of hardware, or may be implemented in a form of hardware in addition to a software functional unit.

Based on the foregoing descriptions of the implementations, a person skilled in the art may clearly understand that this application may be implemented by software in addition to necessary universal hardware or by hardware only. In most circumstances, the former is a preferred implementation. Based on such an understanding, the technical solutions of this application essentially or the part contributing to the current technology may be implemented in a form of a software product. The software product is stored in a readable storage medium, such as a floppy disk, a hard disk or an optical disc of a computer, and includes several instructions for instructing a computer device (which may be a personal computer, a server, or a network device) to perform the methods described in the embodiments of this application.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A communication method, comprising:
receiving, by a first terminal, service data from a second terminal; and
when a distance value between the first terminal and the second terminal falls within a preset distance range, sending, by the first terminal based on a first preset condition, acknowledgment information indicating that the service data is received successfully or unsuccessfully to the second terminal, wherein
the preset distance range is determined based on a first preset distance value and a second preset distance value, and the second preset distance value is greater than the first preset distance value, and wherein
the service data is transmitted in a form of a transport block, and the first preset condition comprises a block error rate being greater than a block error rate threshold; and
the sending, by the first terminal based on the first preset condition, acknowledgment information indicating that the service data is received successfully or unsuccessfully to the second terminal comprises:
when a current block error rate meets the first preset condition, sending, by the first terminal, acknowledgment information indicating that the transport block is received successfully or unsuccessfully to the second terminal; and
when the distance value is less than or equal to the second preset distance value, updating, by the first terminal, the current block error rate based on a status of the transport block being received successfully or unsuccessfully.

2. The communication method according to claim 1, further comprising:
when the distance value between the first terminal and the second terminal falls within the preset distance range, sending, by the first terminal based on a second preset condition, acknowledgment information indicating that the service data is received successfully or unsuccessfully to the second terminal, wherein
the second preset condition comprises a time length between a first time point and a second time point being less than a preset time parameter, wherein the first time point is a time point at which the distance value is determined to be less than or equal to the first preset distance value, and the second time point is a time point at which the distance value is determined to fall within the preset distance range; and
the sending, by the first terminal based on the second preset condition, acknowledgment information indicating that the service data is received successfully or unsuccessfully to the second terminal comprises:
when the time length between the first time point and the second time point meets the second preset condition, sending, by the first terminal, the acknowledgment information indicating that the service data is received successfully or unsuccessfully to the second terminal.

3. The communication method according to claim 2, wherein the preset time parameter configures a timer, a timing duration of the timer is T, and the first time point is a start time point of the timer; and
when the time length between the first time point and the second time point meets the second preset condition, sending, by the first terminal, the acknowledgment information indicating that the service data is received successfully or unsuccessfully to the second terminal comprises:
when the timer is in a running state, sending, by the first terminal, the acknowledgment information indicating that the service data is received successfully or unsuccessfully to the second terminal.

4. The communication method according to claim 1, further comprising:
when the distance value between the first terminal and the second terminal falls within the preset distance range, sending, by the first terminal based on a third preset condition, acknowledgment information indicating that the service data is received successfully or unsuccessfully to the second terminal,
wherein the service data is service data repeatedly transmitted by the second terminal, and is transmitted in the form of the transport block; and the third preset condition comprises when the first terminal receives the transport block for the first time, the distance value is less than or equal to the first preset distance value; and
the sending, by the first terminal based on the third preset condition, acknowledgment information indicating that the service data is received successfully or unsuccessfully to the second terminal comprises:
when the retransmitted transport block meets the third preset condition, sending, by the first terminal, acknowledgment information indicating that the retransmitted transport block is received successfully or unsuccessfully to the second terminal.

5. The communication method according to claim 1, wherein the method further comprises:
correcting, by the first terminal, an initial distance value between the first terminal and the second terminal based on a relative movement speed between the first terminal and the second terminal and a preset correction time period, to obtain the distance value between the first terminal and the second terminal; or
correcting, by the first terminal, an initial distance value between the first terminal and the second terminal based on a relative movement speed between the first terminal and the second terminal and a preset correspondence, to obtain the distance value between the first terminal and the second terminal, wherein the initial distance value is a distance value indicated by reference signal received power, and the preset correspondence is a correspondence between the relative movement speed and a reference signal received power adjustment amount.

6. A communication apparatus, comprising:
a receiver configured to receive service data from a second terminal;
a processor configured to determine that a distance value between the communication apparatus and the second terminal falls within a preset distance range and meets a first preset condition; and
a transmitter configured to: when the processor determines that the distance value between the communication apparatus and the second terminal falls within the preset distance range and meets the first preset condition, send acknowledgment information indicating that the service data is received successfully or unsuccessfully to the second terminal, wherein
the preset distance range is determined based on a first preset distance value and a second preset distance value, and the second preset distance value is greater than the first preset distance value, wherein
the service data is transmitted in a form of a transport block, and the first preset condition comprises a block error rate being greater than a block error rate threshold; and
the processor configured to determine when the first preset condition is met further comprises the processor configured to: determine that a current block error rate meets the first preset condition; and
wherein the processor is further configured to: when the distance value is less than or equal to the second preset distance value, update the current block error rate based on a status of the transport block being received successfully or unsuccessfully.

7. The communication apparatus according to claim 6, further comprising:
the processor further configured to determine the distance value between the communication apparatus and the second terminal falls within the preset distance range and when a second preset condition is met, send acknowledgment information indicating that the service data is received successfully or unsuccessfully to the second terminal, wherein
the second preset condition comprises a time length between a first time point and a second time point being less than a preset time parameter, wherein the first time point is a time point at which the distance value is determined to be less than or equal to the first preset distance value, and the second time point is a time point at which the distance value is determined to fall within the preset distance range; and
the processor configured to determine when the second preset condition is met further comprises the processor configured to: determine that the time length between the first time point and the second time point meets the second preset condition.

8. The communication apparatus according to claim 7, wherein the preset time parameter configures a timer, a timing duration of the timer is T, and the first time point is a start time point of the timer; and
the processor configured to determine that the time length between the first time point and the second time point meets the second preset condition further comprises the processor configured to: determine that the timer is in a running state.

9. The communication apparatus according to claim 6, further comprising:
the processor further configured to determine the distance value between the communication apparatus and the second terminal falls within the preset distance range and when a third preset condition is met, send acknowledgment information indicating that the service data is received successfully or unsuccessfully to the second terminal, wherein
the service data is service data repeatedly transmitted by the second terminal, and is transmitted in the form of the transport block; and the third preset condition comprises when the communication apparatus receives the transport block for the first time, the distance value is less than or equal to the first preset distance value; and
the processor configured to determine when the third preset condition is met further comprises the processor configured to: determine that the retransmitted transport block meets the third preset condition.

10. The communication apparatus according to claim 6, wherein the processor is further configured to correct an initial distance value between the communication apparatus and the second terminal based on a relative movement speed between the communication apparatus and the second terminal and a preset correction time point period, to obtain the distance value between the communication apparatus and the second terminal; or
the processor is further configured to correct an initial distance value between the communication apparatus and the second terminal based on a relative movement speed between the communication apparatus and the second terminal and a preset correspondence, to obtain the distance value between the communication apparatus and the second terminal, wherein the initial distance value is a distance value indicated by reference signal received power, and the preset correspondence is a correspondence between the relative movement speed and a reference signal received power adjustment amount.

11. A non-transitory computer readable storage medium, comprising a program or instructions, wherein when the program or the instructions is/are executed by a computer processing system of a first terminal, the program or the instructions cause the first terminal to perform a communication method, comprising:
receiving, by the first terminal, service data from a second terminal; and
when a distance value between the first terminal and the second terminal falls within a preset distance range, sending, by the first terminal based on a first preset condition, acknowledgment information indicating that the service data is received successfully or unsuccessfully to the second terminal, wherein
the preset distance range is determined based on a first preset distance value and a second preset distance value, and the second preset distance value is greater than the first preset distance value, and wherein
the service data is transmitted in a form of a transport block, and the first preset condition comprises a block error rate being greater than a block error rate threshold; and
the sending, by the first terminal based on the first preset condition, acknowledgment information indicating that the service data is received successfully or unsuccessfully to the second terminal comprises:
when a current block error rate meets the first preset condition, sending, by the first terminal, acknowledgment information indicating that the transport block is received successfully or unsuccessfully to the second terminal; and when the distance value is less than or equal to the second preset distance value, updating, by the first terminal, the current block error rate based on a status of the transport block being received successfully or unsuccessfully.

12. The non-transitory computer readable storage medium according to claim 11, further comprising:
when the distance value between the first terminal and the second terminal falls within the preset distance range, sending, by the first terminal based on a second preset condition, acknowledgment information indicating that the service data is received successfully or unsuccessfully to the second terminal, wherein
the second preset condition comprises a time length between a first time point and a second time point being less than a preset time parameter, wherein the first time point is a time point at which the distance value is determined to be less than or equal to the first preset distance value, and the second time point is a time point at which the distance value is determined to fall within the preset distance range; and
the sending, by the first terminal based on the second preset condition, acknowledgment information indicating that the service data is received successfully or unsuccessfully to the second terminal comprises:
when the time length between the first time point and the second time point meets the second preset condition, sending, by the first terminal, the acknowledgment information indicating that the service data is received successfully or unsuccessfully to the second terminal.

13. The non-transitory computer readable storage medium according to claim 12, wherein the preset time parameter configures a timer, a timing duration of the timer is T, and the first time point is a start time point of the timer; and
when the time length between the first time point and the second time point meets the second preset condition, sending, by the first terminal, the acknowledgment information indicating that the service data is received successfully or unsuccessfully to the second terminal comprises:
when the timer is in a running state, sending, by the first terminal, the acknowledgment information indicating that the service data is received successfully or unsuccessfully to the second terminal.

14. The non-transitory computer readable storage medium according to claim 11, further comprising:
when the distance value between the first terminal and the second terminal falls within the preset distance range, sending, by the first terminal based on a third preset condition, acknowledgment information indicating that the service data is received successfully or unsuccessfully to the second terminal,
wherein the service data is service data repeatedly transmitted by the second terminal, and is transmitted in a form of a transport block; and the third preset condition comprises when the first terminal receives the transport block for the first time, the distance value is less than or equal to the first preset distance value; and
the sending, by the first terminal based on the third preset condition, acknowledgment information indicating that the service data is received successfully or unsuccessfully to the second terminal comprises:
when the retransmitted transport block meets the third preset condition, sending, by the first terminal, acknowledgment information indicating that the retransmitted transport block is received successfully or unsuccessfully to the second terminal.

15. The non-transitory computer readable storage medium according to claim 11, wherein the method further comprises:
correcting, by the first terminal, an initial distance value between the first terminal and the second terminal based on a relative movement speed between the first terminal and the second terminal and a preset correction time period, to obtain the distance value between the first terminal and the second terminal; or
correcting, by the first terminal, an initial distance value between the first terminal and the second terminal based on a relative movement speed between the first terminal and the second terminal and a preset correspondence, to obtain the distance value between the first terminal and the second terminal, wherein the initial distance value is a distance value indicated by reference signal received power, and the preset correspondence is a correspondence between the relative movement speed and a reference signal received power adjustment amount.

* * * * *